(12) United States Patent
Mizuno

(10) Patent No.: US 7,401,078 B2
(45) Date of Patent: Jul. 15, 2008

(54) INFORMATION PROCESSING APPARATUS, DOCUMENT SEARCH METHOD, PROGRAM, AND STORAGE MEDIUM

(75) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 11/195,616

(22) Filed: Aug. 3, 2005

(65) Prior Publication Data

US 2006/0031211 A1 Feb. 9, 2006

(30) Foreign Application Priority Data

Aug. 6, 2004 (JP) ............................. 2004-231435

(51) Int. Cl.
*G06F 17/30* (2006.01)
(52) U.S. Cl. ........................................................ 707/6
(58) Field of Classification Search .................. 707/2, 707/3, 6, 104.1, 10; 715/501.1; 455/566
See application file for complete search history.

(56) References Cited

U.S. PATENT DOCUMENTS 6,832,350 B1 * 12/2004 Bates et al. .............. 715/501.1
6,964,011 B1    11/2005 Mizuno ...................... 715/513
2001/0018353 A1 *  8/2001 Ishigaki ....................... 455/566
2003/0187834 A1 * 10/2003 Oda et al. ...................... 707/3
2003/0220912 A1 * 11/2003 Fain et al. ...................... 707/3

FOREIGN PATENT DOCUMENTS

JP    2000-315210    11/2000

* cited by examiner

*Primary Examiner*—Etienne P LeRoux
(74) *Attorney, Agent, or Firm*—Fitzpatrick, Cella, Harper & Scinto

(57) ABSTRACT

There is provided a search technique capable of outputting a proper number of accurate search results within a short time in searching a plurality of databases for a document. To achieve this object, an information processing apparatus according to this invention has the following arrangement. That is, an information processing apparatus which searches a plurality of databases for a document includes a unit which searches for a document stored in an arbitrary database among the plurality of databases, a unit which records access information to documents stored in the plurality of databases, a unit which extracts a document close in access order to the searched document by using the access information and calculates a related level to the searched document on the basis of the access order, and a unit which can outputs as search results the searched document and the document whose related level is calculated.

11 Claims, 25 Drawing Sheets

FIG. 7

```
<Relevance Document> ~701
    <AccessUser id="00110" group="150"> ~702
706─┤   <Document order="0"
            date="2004-06-25"
            time="17 : 48 : 05+0900">
703─┤   <Document order="1"
            name="E"
            id="34298"
            database="172. 10. 5. 14"
            dbname="Cabinet 3"
            date="2004-06-25"
            time="17 : 51 : 17+0900" />
704─┤   <Document order="2"
            name="C"
            id="00243"
            database="172. 25. 3. 213"
            dbname="Cabinet 2"
            date="2004-06-25"
            time="17 : 58 : 22+0900" />
    </AccessUser>
705─┤<AccessUser id="03521" gruop="092">
        .........
    </AccessUser>
</RelevanceDocument>
```

FIG. 8

```
<RelevanceDocument>
  <AccessUser id="00110" group="150">
    <Document order="-1"
      name="C"
      id="00243"
      database="172. 25. 3. 213"
      dbname="Cabinet 2"
      date="2004-06-25"
      time="17 : 25 : 12+0900"/>
    <Document order="0"
      date="2004-06-25"
      time="17 : 48 : 05+0900" />
    <Document order="1"
      name="E"
      id="34298"
      database="172. 10. 5. 14"
      dbname="Cabinet 3"
      date="2004-06-25"
      time="17 : 51 : 17+0900" />
  </AccessUser>
  <AccessUser id="03521" gruop="092" >
    .........
  </AccessUser>
</RelevanceDocument>
```

801 — points to the first Document block

FIG. 13

| DOCUMENT ID (1301) | DOCUMENT NAME (1302) | SCORE (1303) |
|---|---|---|
| 01623 | xxx | 300 |
| 22115 | yyy | 250 |
| 93162 | zzz | 210 |
| ... | ... | ... |

FIG. 15

| i | TIME DIFFERENCE (td) | $P_i$ |
|---|---|---|
| 1 | $1 < td \leq 2$ | 0.9 |
| 2 | $2 < td \leq 3$ | 0.8 |
| 3 | $3 < td \leq 6$ | 0.5 |
| 4 | $6 < td \leq 12$ | 0.1 |

FIG. 19

```
<RelevanceDocument>
  <AccessUser id="00110" group="150">
    <Document order="0"
      date="2004-06-25"
      time="17:51:17+0900">
    <Document order="1"
      name="C"
      id="00243"
      checkout="yes"
      database="172.25.3.213"
      dbname="Cabinet 2"
      date="2004-06-25"
      time="17:58:22+0900" />
    <Document order="2"
      name="D"
      id="15874"
      database="172.25.3.213"
      dbname="Cabinet 2"
      date="2004-06-25"
      time="18:28:46+0900" />
  </AccessUser>
  <AccessUser id="03521" gruop="092">
    .........
  </AccessUser>
</RelevanceDocument>
```

1901 points to `<Document order="1"`

FIG. 20

```
<RelevanceDocument>
  <AccessUser id="00110" group="150">
    <Document order="-1"
      name="E"
      id="34298"
      checkout="yes"
      database="172. 10. 5. 14"
      dbname="Cabinet 3"
      date="2004-06-25"
      time="17 : 51 : 17+0900">
    <Document order="0"
      date="2004-06-25"
      time="17 : 58 : 22+0900">
    <Document order="1"
      name="D"
      id="15874"
      database="172. 25. 3. 213"
      dbname="Cabinet 2"
      date="2004-06-25"
      time="18 : 28 : 46+0900" / >
  </AccessUser>
  <AccessUser id="03521" gruop="092">
    .........
  </AccessUser>
</RelevanceDocument>
```

2001 points to the `<Document order="-1"` block.

FIG. 22

DOCUMENT B
```
<RelevanceDocument>
 <AccessUser id="00110" group="150">
  <Document order="0"
   date="2004-06-25"
   time="17:48:05+0900"/>
  <Document order="1"
   name="E"
   id="34298"
   copy="to"                                    ~2201
   database="172.10.5.14"
   dbname="Cabinet 3"
   date="2004-06-25"
   time="17:51:17+0900"/>
  <Document order="2"
   name="C"
   id="00243"
   database="172.25.3.213"
   dbname="Cabinet 2"
   date="2004-06-25"
   time="17:58:22+0900"/>
   ..........
 </AccessUser>
 <AccessUser id="03521" gruop="092">
  ..........
 </AccessUser>
</RelevanceDocument>
```

DOCUMENT E
```
<RelevanceDocument>
 <AccessUser id="00110" group="150">
  <Document order="0"
   date="2004-06-25"
   time="17:51:17+0900"/>
  <Document order="1"
   name="C"
   id="00243"
   checkout="yes"
   database="172.25.3.213"
   dbname="Cabinet 2"
   date="2004-06-25"
   time="17:58:22+0900"/>
  <Document order="2"
   name="D"
   id="15874"
   database="172.25.3.213"
   dbname="Cabinet 2"
   date="2004-06-25"
   time="18:28:46+0900"/>
  <Document order=""                            ~2202
   name="B"
   id="40105"
   copy="from"
   database="172.25.3.120"
   dbname="Cabinet 1"/>
 </AccessUser>
 <AccessUser id="03521" gruop="092">
  ..........
 </AccessUser>
</RelevanceDocument>
```

INFORMATION PROCESSING APPARATUS, DOCUMENT SEARCH METHOD, PROGRAM, AND STORAGE MEDIUM

FIELD OF THE INVENTION

The present invention relates to an electronic document management technique, and more particularly, to a search technique for searching for an electronic document.

BACKGROUND OF THE INVENTION

In the offices of companies and public agencies, networking and digitization of the office environment are progressing. Now, various documents are stored as electronic documents using software such as wordprocessor software, spreadsheet software, or presentation software. Also, paper documents are converted into electronic documents by a device such as a scanner, and the electronic documents are stored.

Hence, many electronic documents must be stored in the office, and many offices introduce a document management system to realize efficient management of electronic documents (see, e.g., Japanese Patent Laid-Open No. 2000-315210).

However, the number of documents processed in one database is limited, and when the number of registered documents increases, the database is divided into a plurality of databases to manage documents. Since the search of many documents decreases search efficiency (requires a long search time), a distributed database environment must be prepared. As an initial operation policy of the document management system, a database may be divided for each department or each type of document. Thus, it should be taken into consideration that a plurality of databases are searched for an electronic document in the document management system.

As the document management system which searches a plurality of distributed databases, there is proposed a system shown in FIG. 3. In FIG. 3, reference numerals 301 to 303 denote document management servers; and 305, a client. The document management servers 301 to 303 and the client 305 are connected to each other via a network 304. In FIG. 3, the document management system and the database are in one-to-one correspondence for descriptive convenience, and no volume server is illustrated.

In the document management system, when the client 305 issues a search instruction, each document management server searches a database connected to it, and the client 305 presents, to the user, a set of search results from the document management servers as final search results. However, search of a plurality of databases by using this search method poses the following problems.

When the document management system is so designed as to sequentially search the databases of respective document management servers, the time taken for the search process increases depending on the number of databases to be searched. This problem can be avoided when document management servers 301, 302, and 303 are so designed as to parallel-search their databases. In this case, however, the process must wait for a search result from a database which requires the longest search time, and shortening of the process time is limited.

When different scoring criteria (scoring algorithms) are used for search between databases, no accurate ranking (final search results) can be obtained by simply concatenating final search results in accordance with their scores in displaying the final search results on the client 305. In addition, when the number of databases is large, the number of final search results also becomes large (for example, in an environment where 10 databases are connected, when 100 search results are received from each database, 1,000 final search results are displayed).

These problems occur when the conventional search method is used for searching a plurality of databases. That is, first, the process time becomes longer as the number of databases to be searched increases. Second, no accurate results can be obtained as final results. Finally, the number of final results increases as the number of databases to be searched increases.

SUMMARY OF THE INVENTION

The present invention has been made to overcome the conventional drawbacks, and has as its object to provide a search technique capable of outputting a proper number of accurate search results within a short time in searching a plurality of databases for a document.

In order to achieve the above object, an information processing apparatus according to the present invention has the following arrangement.

That is, an information processing apparatus which searches a plurality of databases for a document comprises search unit configured to search for a document stored in an arbitrary database among the plurality of databases, recording unit configured to record access information to documents stored in the plurality of databases, calculation unit configured to extract a document close in access order to the document searched by the search unit by using the access information, and calculating a related level to the document searched by the search unit on the basis of the access order, and output unit configured to output as search results the document searched by the search unit and the document whose related level is calculated by the calculation unit.

According to the present invention, a proper number of accurate search results can be output within a short time in searching for a document in a distributed database environment where a plurality of databases exist.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing an example of related document access information;

FIG. 8 is a view showing another example of the related document access information;

FIG. 13 is a table showing an example of a primary search result list;

FIG. 15 is a table showing an example of a table for determining weighting in accordance with the access time;

FIG. 19 is a view showing an example of related document access information representing the checkout state;

FIG. 20 is a view showing another example of the related document access information representing the checkout state;

FIG. 22 is a view showing an example of related document access information representing a state in which contents are copied between documents;

DETAILED DESCRIPTION OF THE PREFERRED EMBODIMENTS

Preferred embodiments of the present invention will now be described in detail in accordance with the accompanying drawings.

First Embodiment

<Configuration of Document Management System>

Figure 2:
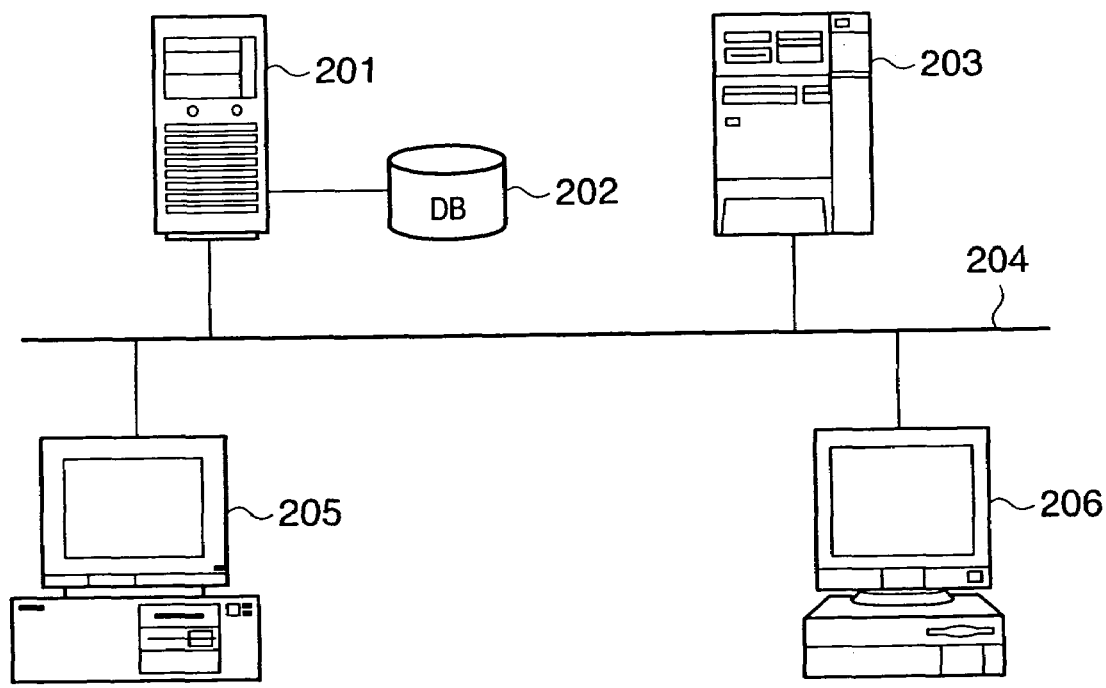
FIG. 2 is a view showing the configuration of a document management system having the information processing apparatus according to the first embodiment of the present invention.
Figure 3:
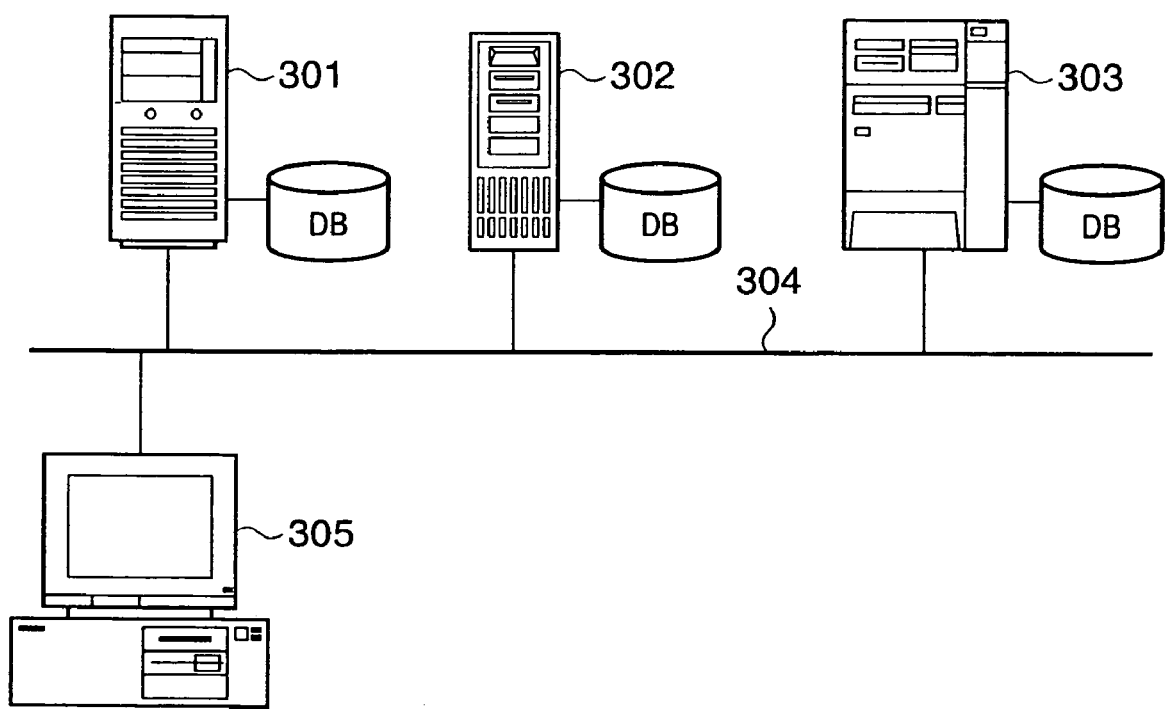
FIG. 3 is a view showing an example of a document management system which searches a plurality of databases.

FIG. 2 is a view showing the configuration of a document management system having an information processing apparatus (document management server) according to the first embodiment of the present invention. In FIG. 2, reference numeral 201 denotes a document management server having a database 202. The document management server 201 holds, in the database 202, document attributes (e.g., a storage location in the document management system, the storage location of actual document data, a creation date, an update date, and the owner) and a log which records user operation and access. Reference numeral 203 denotes a document volume server which stores actual data of a document. Data in the document volume server 203 is compressed and efficiently stored. The document management server 201 and document volume server 203 are connected to client PCs 205 and 206 via a network 204. The client PCs 205 and 206 store document data into the server or acquire document data from the server via document management client software (not shown).

A case wherein document data is registered from the client PC 205 into the document management system will be exemplified. The document management client software is activated on the client PC 205, and the client PC 205 is connected to the document management server 201. A folder in the document management system is designated to instruct the document management client software to register document data. Then, the document management server 201 determines whether the client PC 205 is permitted to register a document, for example, whether the client PC 205 has a right to access a folder and whether the client PC 205 has a capacity enough to store the document. If so, attribute information such as the creation date, update date, and owner of the document is stored in the database 202 of the document management server 201, and actual data of the document is stored in the document volume server 203. At this time, the document management server 201 is notified of the storage location of the actual document data in the document volume server 203, and this information is also stored. Further, a record that the document has been registered is also held as a log. The client PC 205 acquires the selected document from the document volume server 203 via the document management client software, and can edit the document by using corresponding application software. After the document is edited, the updated document data is stored in the document volume server 203. The document management server 201 is notified of the updated information, and updates the management information.

In order to execute indexing for full-text retrieval for a registered document, preparations for full-text retrieval may be made by extracting texts by OCR (Optical Character Recognition) or directly extracting texts from application software. Texts may be extracted at a timing when a document is registered, or at once at night or the like by using a scheduler.

The document management system can be equipped with a version management mechanism of saving a document before update. According to this mechanism, a designated number of pieces of information before update are held in the database. When version management is executed, actual documents before update and latest actual documents are stored in the document volume server 203, and version information of the documents is recorded in the document management server 201. The document management system may adopt a mechanism of generating a thumbnail for displaying a reduced image of a document in registering the document.

The document management system comprises a mechanism of searching for a document because many documents are registered by many users. Examples of the search method are retrieval based on attribute information of a document (e.g., the name, creator, creation date, and update user of a document), and the above-mentioned full-text retrieval based on index information created by converting an image into a text by OCR or directly extracting a text from a document generated by application software. The user exploits such a search mechanism prepared for the document management system in order to efficiently search for a target document.

The database 202 in the document management server 201 stores attribute information of each document such as document name, and index information for full-text retrieval. In search, when the database 202 is a relational database, it is searched by SQL. In search, weighting is done in accordance with the significance of a search key, or the number of keywords which appear in a document is counted to perform scoring and determine ranking.

<Document Management Client Software>

Figure 4:
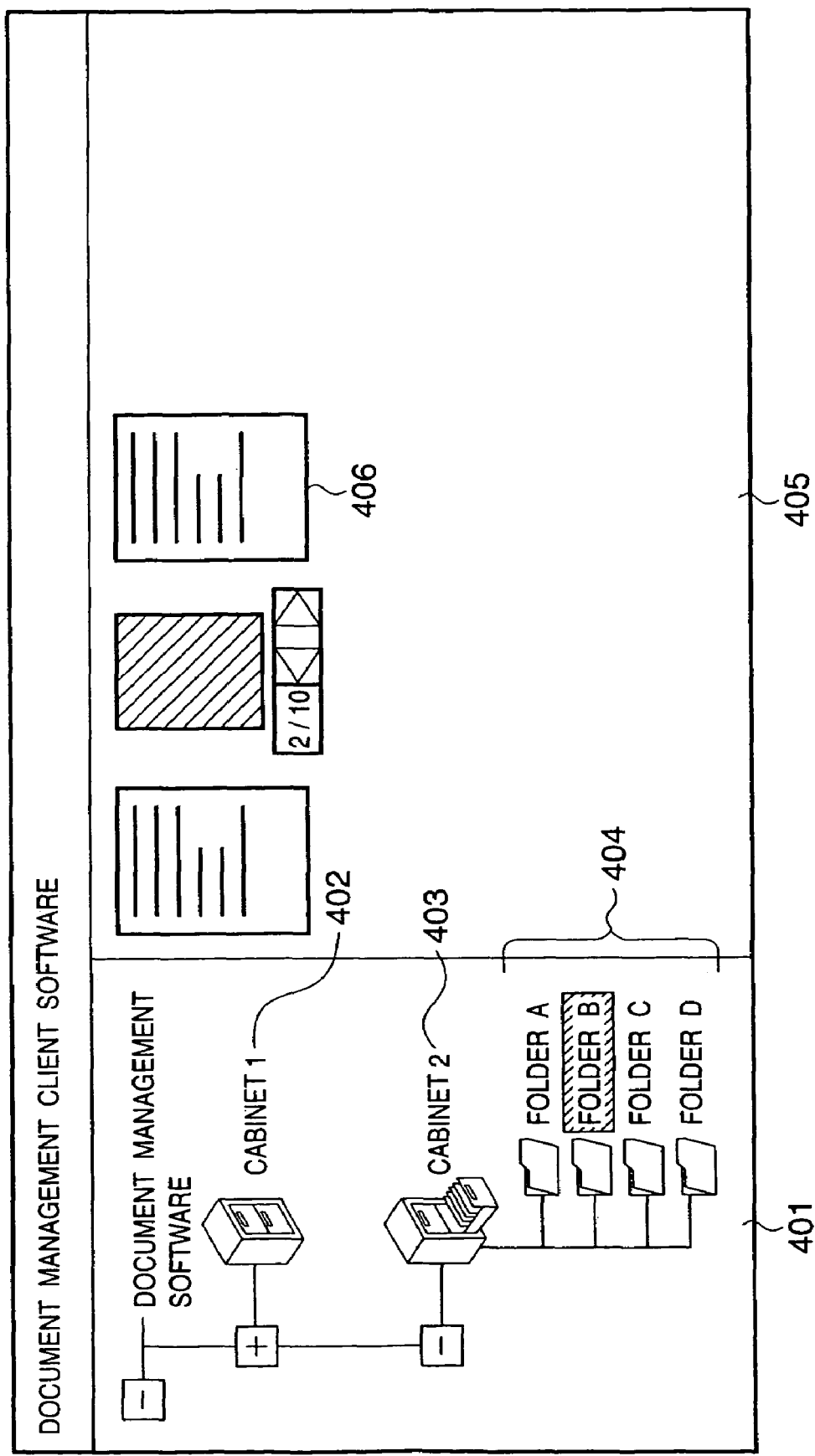
FIG. 4 is a view showing an example of the structure of the window of document management client software.

FIG. 4 shows an example of the structure of the window of the document management client software. Assume that the document management system in the document management system described in the first embodiment is based on a plurality of cabinets, a plurality of folders are held in each cabinet, and a plurality of documents are held in each folder. A folder may further contain another folder. Note that a cabinet in FIG. 4 is synonymous with a database, and cabinets 402 and 403 are managed by different databases.

Reference numeral 401 is a view for access on a tree structure based on the above document management system. The cabinets 402 and 403 contain folders. The cabinet 402 is closed, and the cabinet 403 is open. When a cabinet is closed, "+" is displayed beside the cabinet, and when it is open, "−" is displayed beside it. This mechanism also applies to a folder. An open cabinet shows its internal folders, as represented by 404. When a cabinet is selected at the view 401, a display column 405 displays a list of folders contained in the cabinet, and when a folder is selected, displays documents and folders contained in the folder. As the display method, a thumbnail may be displayed for a document, and an icon may be displayed for a folder, as represented in the display column 405. Although not shown, a list of documents may be displayed together with information accessory to each document (e.g., a document name, a size, the number of pages, and an update date). These display methods may also be combined.

A document 406 in the display column 405 can be opened and edited using a corresponding application. The document is edited using, as the corresponding application, a corresponding word processing application for a word processing document or a corresponding spreadsheet application for a spreadsheet document. A document and an application can be made to correspond using a function of making the extension of a file name and an application correspond to each other by the operating system, which is a known technique.

Figure 5:
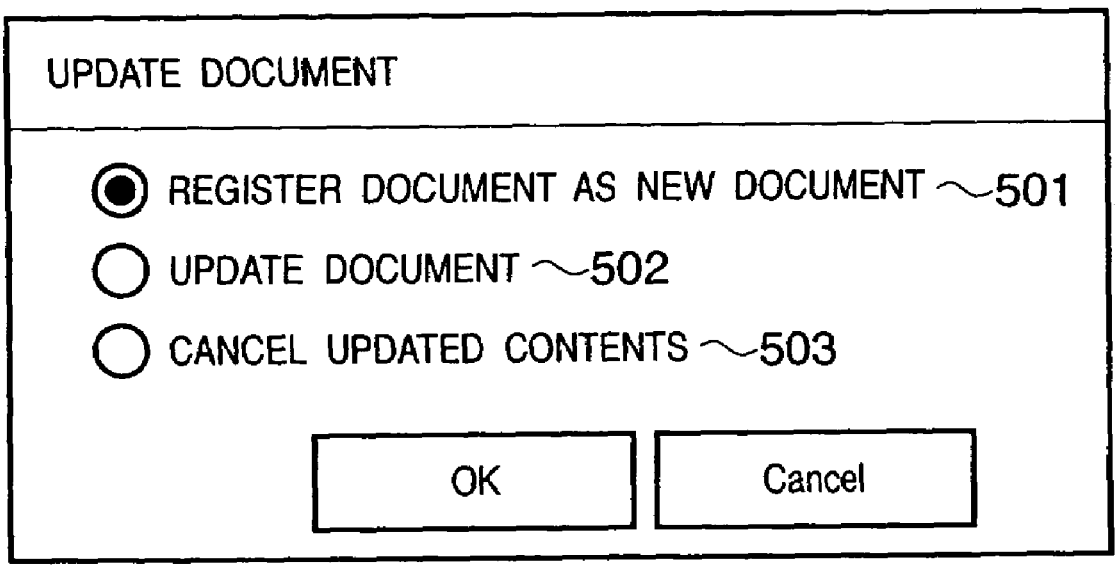
FIG. 5 is a view showing an example of a user interface used to update a document in the document management client software.

After the document 406 is edited by a corresponding application, the document management client software displays, e.g., a confirmation message in FIG. 5. The user can select a process for the edited document from "save the document as a new document" (501), "update the document" (502), and "cancel the update" (503). When the user selects the process 501, the edited document is newly registered as a different document in the document volume server 203 and document management server 201 of the document management system. When the user selects the process 503, the update process and editing of the document are canceled. That is, a change of the document is not reflected in the document volume server 203 and document management server 201. When the user selects the process 502, a changed document replaces the original one in the document volume server 203, and the edited information is stored in the document management server 201.

<Functional Configuration of Document Management Server>

Figure 1:
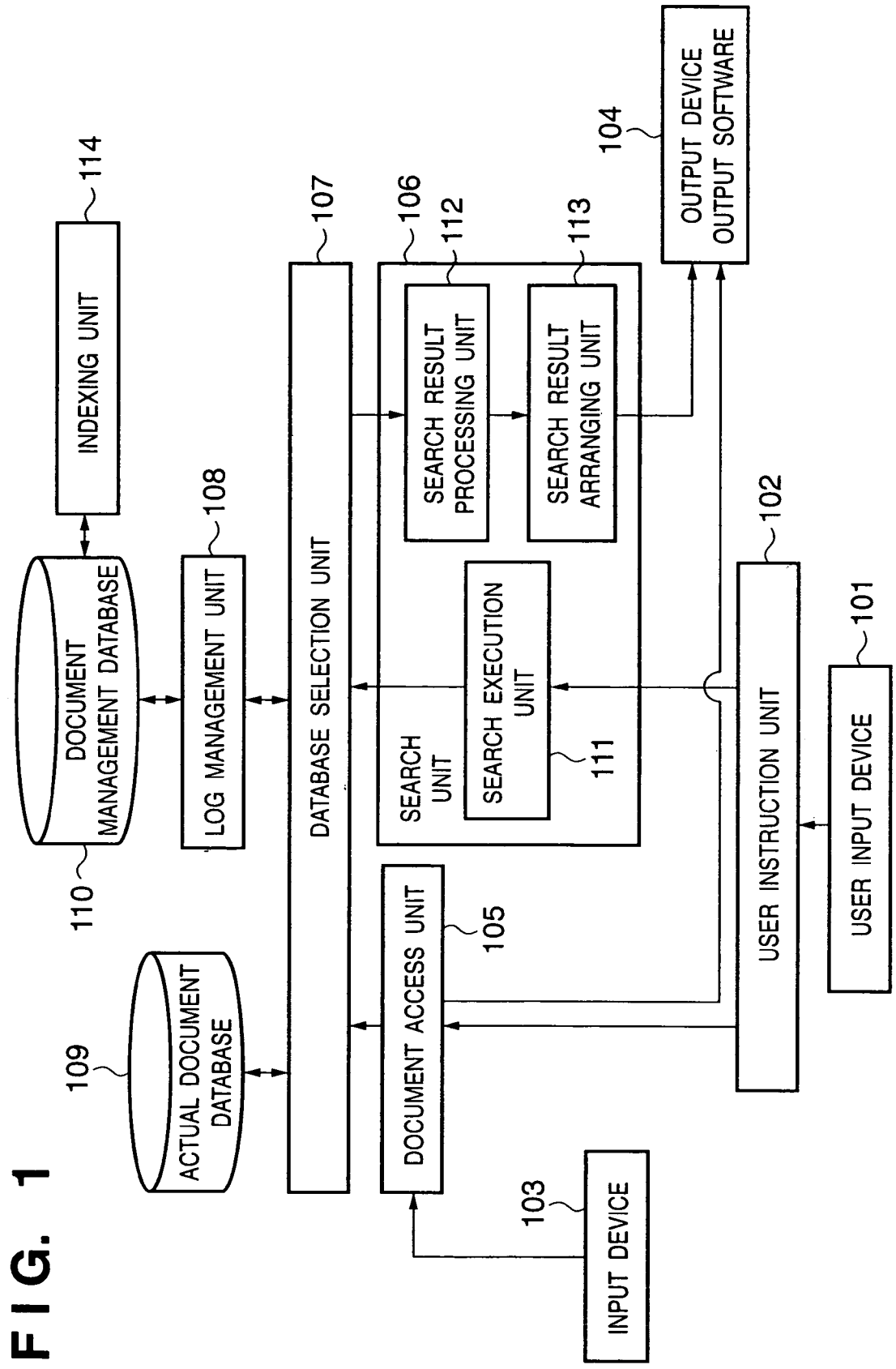
FIG. 1 is a block diagram for explaining the functional configuration of an information processing apparatus according to the first embodiment of the present invention.

FIG. 1 is a block diagram for explaining the functional configuration of the information processing apparatus (document management server) according to the first embodiment of the present invention. When an operation instruction associated with a document such as registration, deletion, or editing of a document is issued to the document management system from a user input device 101 such as a keyboard or mouse, a user instruction unit 102 receives the instruction and passes control to a document access unit 105. When a search instruction is issued, the user instruction unit 102 receives the instruction and passes control to a search unit 106.

A document registration process will be explained. When a document to be registered is selected with the user input device 101 such as a keyboard or mouse and a registration instruction is issued, the user instruction unit 102 receives the instruction, and the designated document is input from an input device 103 to the document access unit 105. The input device 103 includes not only an actual device such as a scanner or digital copying machine, but also a virtual device such as the file system of the operating system. The document access unit 105 uses a database selection unit 107 to select, as a database designated by the user, a document management database 110 and actual document database 109 which are to be accessed. The document access unit 105 stores the document input from the input device 103 in the actual document database 109, and stores attribute information (e.g., the storage location, user information, and date information of the actual document) in the document management database 110.

Indices of texts for full-text retrieval are created by an indexing unit 114. For an image document, the indexing unit 114 executes OCR (Optical Character Recognition), and for an application document, extracts a character from the application document. The indexing unit 114 converts the data into a text to create an index for full-text retrieval, and stores the index in the document management database 110. The indexing unit 114 may be invoked upon registration of a document, or by a scheduler or the like during a certain time period such as night during which the document management system is rarely used.

A document delete process will be explained. When a document to be deleted is selected with the user input device 101 such as a keyboard or mouse and a delete instruction is issued, the user instruction unit 102 receives the instruction, and instructs the document access unit 105 to delete the document. The document access unit 105 determines via the database selection unit 107 a database which stores the designated document. The document access unit 105 acquires the actual document database 109 serving as the storage location of the document and a position in the actual document database 109 from the document management database 110. The document access unit 105 deletes the document information from the document management database 110. At the same time, the document access unit 105 deletes actual document data of the document at the acquired position from the acquired actual document database 109.

A document editing process will be explained. Editing of a document in the document management system is controlled by two, checkout and checkin instructions. More specifically, in order to edit a document, the document is selected with the user input device 101 such as a keyboard or mouse, and an editing instruction is issued. The user instruction unit 102 receives the instruction, and instructs the document access unit 105 to perform checkout. The document access unit 105 accesses via the database selection unit 107 the document management database 110 which stores management data of the document to be edited. The document access unit 105 changes the document to a checkout (editing) state, acquires the actual document from the actual document database 109, and transfers the actual document to an output device 104. As a result, an application for editing runs, and the user can edit the document. At this time, the state of the document in the document management database 110 is the checkout state, and even if another user tries to access the document, the document management database 110 rejects the process. Instead of rejecting all document operations, only some operations may be rejected such that read-only opening of a document is permitted while editing is inhibited.

After the end of editing, the user instruction unit 102 instructs the document access unit 105 to perform checkin of the document. The end of editing may be explicitly designated by the user, or detected by detecting the end of an application. Simultaneously when the document access unit 105 cancels the checkout state of the document in the document management database serving as the storage destination of the document, the document access unit 105 acquires the changed document from the input device 103, and updates (replaces) a corresponding document in the actual document database 109. Further, the document access unit 105 updates, for example, attribute information (e.g., an update user and update date) of the updated document in the document management database 110.

A document search process will be explained. To search for a document, the user instruction unit 102 transmits a search instruction to the search unit 106. The search unit 106 selects a database to be searched as a designated database via the database selection unit 107, and searches the document management database 110. As the type of search, a plurality of search methods can be executed including full-text retrieval and retrieval based on coincidence for each attribute. The search unit 106 converts an obtained search result into an easy-to-see format, and sends the result to the output device 104. In place of searching the document management database 110, another server may be prepared to install a search engine.

When the database selection unit 107 accesses the document management database 110, a log management unit 108 monitors all accesses, and the operation history is saved as a log in the document management database 110.

FIG. 1 illustrates only one document management database 110 and one actual document database 109. However, pluralities of document management databases 110 and actual document databases 109 may be prepared, and the database selection unit 107 may select a proper database in accordance with an instruction.

<Database Configuration>

Figure 6:
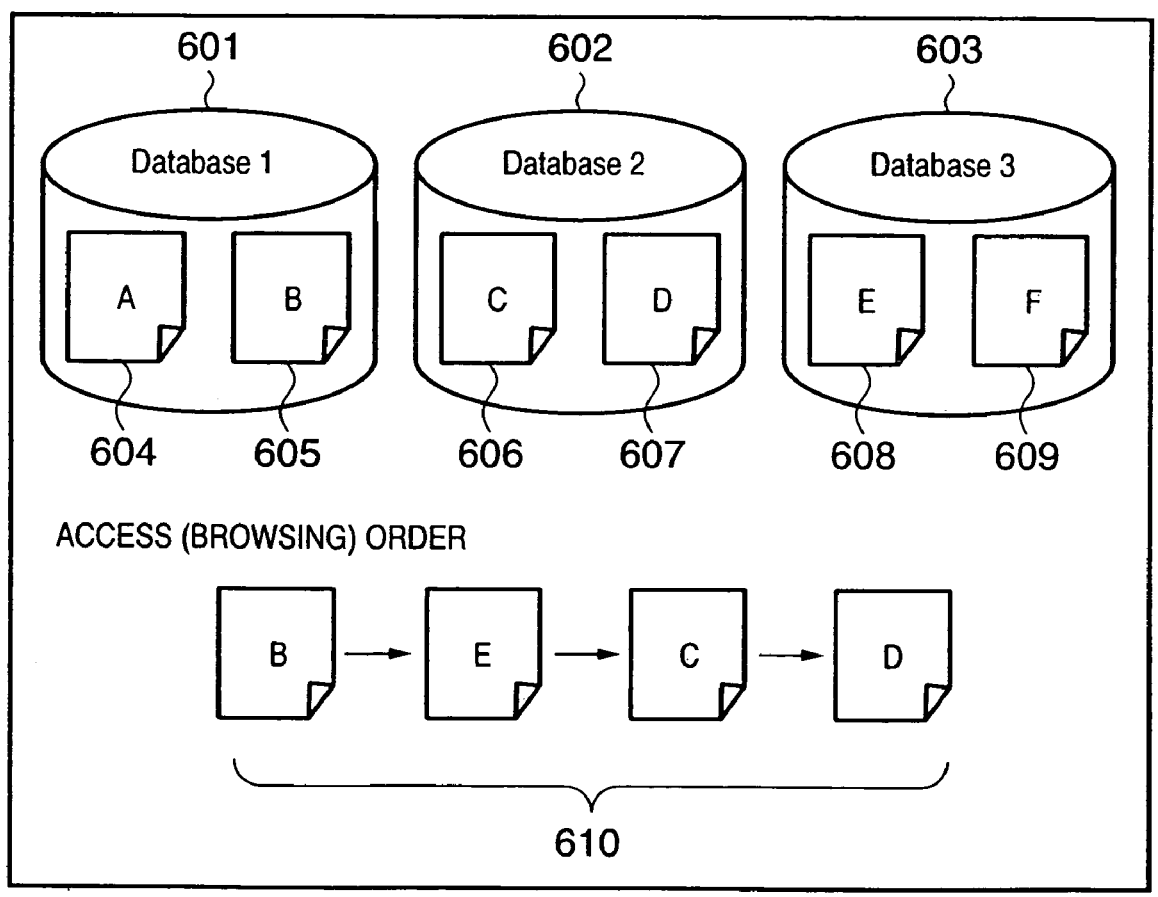
FIG. 6 is a view showing an example of the database of a document management server according to the first embodiment of the present invention.

An example of the database 202 of the document management server according to the first embodiment of the present invention will be described with reference to FIG. 6. In FIG. 6, there are three document management databases (cabinets) 601, 602, and 603, and each database stores two pieces of document information. The document management database 601 stores document information on a document A (604) and document B (605). The document management database 602 stores document information on a document C (606) and document D (607). The document management database 603 stores document information on a document E (608) and document F (609). Assume that a given user accesses documents in an order of B→E→C→D (610). At this time, a document opened next to a specific document is recorded as a document ("related document" (it is occasionally called "relevance document")) which may be related to the specific document, in "related document access information" which is stored for each document in the document management database 110.

<Related Document Access Information>

FIG. 7 shows an example of "related document access information". Upon access to each document, the accessed document is recorded for each user. In the following description, the related document access information is assumed to be recorded in the XML format.

Reference numeral 701 denotes a root element which represents a related document. Access information of each user is recorded following the root element. For descriptive convenience, an XML declaration is omitted. Reference numerals 702 and 705 denote pieces of information for respective users. In the example of FIG. 7, pieces of access information of a plurality of users are recorded in the same XML description, but may be held as separate data for respective users. The information 702 is a tag representing information on a user, and has an id attribute and group attribute. The id attribute exhibits a user ID serving as a unique value for identifying a user, and the group attribute exhibits a unique value (group ID) for identifying a group to which the user belongs. The information 705 is access information of another user having a user ID "03521". Reference numerals 703 and 704 denote pieces of information on related documents, and the order attribute of each of the Document elements 703 and 704 represents an access number counted from a target document. For example, the Document element 703 exhibits "order=1", which represents that a related document is accessed immediately after the target document is opened. The Document element 704 exhibits "order=2", which represents that a related document is accessed after the related document indicated by the Document element 703.

In this description, access means to open a document, but another operation (e.g., confirmation of an attribute) may be recorded.

In addition to the order attribute, the Document elements 703 and 704 record a name attribute, id attribute, database attribute, dbname attribute, date attribute, and time attribute. The name attribute records a document name, the id attribute of the Document attribute records a value (document ID) for uniquely determining a document, and the database attribute indicates the location of the document management database. In this case, an IP address is used as an example, but the present invention is not limited to this and can adopt any information as far as the information can designate a database. For example, a data source name (DSN) may be employed instead of the IP address. A document can be specified when a database and a document ID in the database are uniquely determined. The dbname attribute is the name of a database, and the date and time attributes record the date and time when a document is accessed. A Document element 706 whose order attribute is 0 is information on a target document, and records only an access date (date attribute) and time (time attribute).

In the example of FIG. 7, information is described in the XML format, but is not limited to this and may be described in another format. Two documents accessed after access to a target document are recorded, but the number of documents to be recorded may be increased or only one document may be recorded. Not only documents accessed after access to a target document, but also documents accessed before access to the target document may be recorded. In the example of FIG. 8, the order in a framed description 801 is −1. A negative order means that a document is accessed before access to a target document.

As for the record of access information, the access records of all documents are monitored by the log management unit 108 in FIG. 1 described above, and held as a log (user-specific access list). Necessary information among information on related documents in FIG. 7 is acquired from the log information. Since all log information is recorded for each user, information (FIG. 8) on a document accessed before access to a target document can also be acquired.

"Related document access information" is recorded as attribute information of a target document in the document management database 110. Since recording uses XML having an extension, as described above, the related document access information can be held without greatly changing the database structure. The related document access information may be recorded not as attribute information of a document but by using a dedicated table or the like.

<User-Specific Access List>

The database selection unit 107 records accessed documents for each user. Document access information recorded for each user is "user-specific access list", and this list can be recorded using the XML format. However, the user-specific access list is not limited to XML, and may be recorded in another format. The root element of the "user-specific access list" is AccessUser, and is made up of an id attribute for designating a user ID used to identify a user and a group attribute for identifying a group ID used to identify a group to which the user belongs (similar to 702 in FIG. 7). In the root element, pieces of attribute information are recorded in an order of accessed documents. See FIG. 7 for detailed contents of information on an accessed document because the information has information (order attribute representing the order of access by the user), name attribute, id attribute, database attribute, dbname attribute, date attribute, and time attribute) identical to those of the Document elements 703 and 704 in FIG. 7.

The "related document access information" shown in FIG. 7 records documents accessed by the user before and after a target document (and the order of the accessed documents). To the contrary, the "user-specific access list (log information)" records documents accessed by a given user (and the order of the accessed documents). For example, when related document access information is to be created, the order attribute in the user-specific access list that represents the absolute order of documents accessed by the user is used as the order attribute in the related document access information that represents the relative order of documents before and after a target document. This facilitates creation of the related document access information.

In the description of the embodiment, "related document access information" means only information of a specific user. In other words, the AccessUser element of a specific user is targeted, and elements associated with other users are excluded from targets.

The above-mentioned user-specific access list is information of a single user, and when a plurality of users exist, a corresponding number of user-specific access lists must be prepared. The management system may be so designed as to manage a plurality of users by one access list at once.

The order in the "user-specific access list" is recorded while the document management client software described with reference to FIG. 4 runs. For example, the document management client software is activated to access documents in an order of B→E→C→D, and then is terminated. If the document management client software is reactivated to access the document F, documents up to the document D accessed at last in previous activation are treated as related documents, and the document F is recorded as another access record. However, such access record may also be left when the document management client software is reactivated within a predetermined time.

<Flow of Related Document Access Information Update Process>

Figure 10:
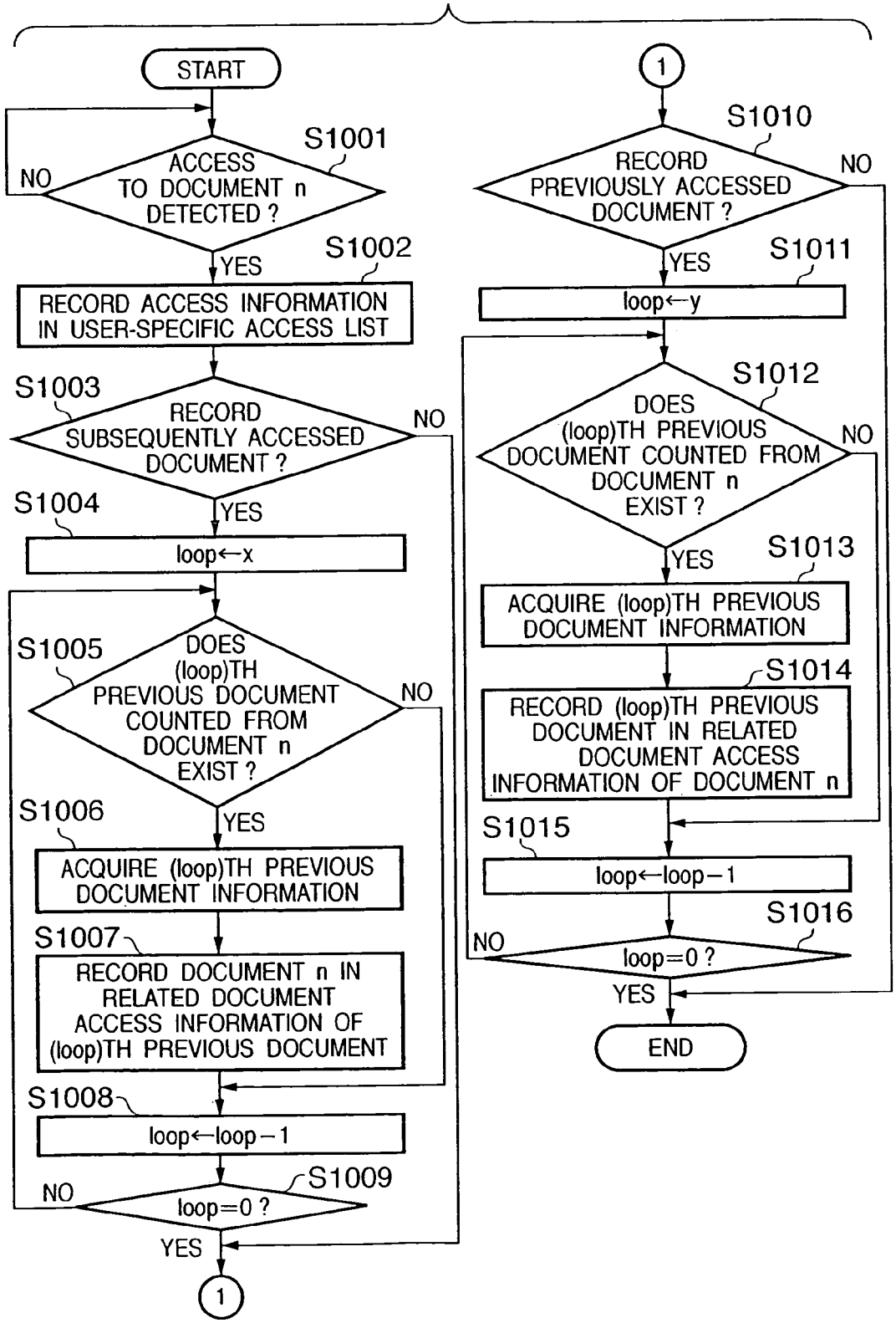
FIG. 10 is a flowchart for explaining the flow of a related document access information update process.

A "related document access information" update process in access to a document will be explained with reference to the flowchart of FIG. 10. If the log management unit 108 detects access to a document n in step S1001, the process advances to step S1002. In step S1002, access log information including a user ID, document name, database name, and access time is recorded in the "user-specific access list" of a corresponding user. When a log is held in the database itself, the document management server records access information.

In step S1003, it is determined whether it is set to record a subsequently accessed document. If YES in step S1003, the process advances to step S1004; if NO, to step S1010. In step S1004, x is substituted into loop. In this case, x represents that it is set to record documents up to the xth subsequently accessed document. In step S1005, it is checked whether the record of the (loop)th previous document counted from the document n exists in the "user-specific access list". If YES in step S1005, the process advances to step S1006; if NO, to step S1008.

In step S1006, the (loop)th previous document information counted from the document n is acquired from the "user-specific access list". The document information is a document attribute formed from information on a document management database which stores a document, an ID for identifying the document, and the like. In step S1007, the document n is recorded as the (loop)th subsequently accessed document in the "related document access information" of the (loop)th previous document from the document information acquired in step S1006. In step S1008, a value calculated by subtracting 1 from loop is set again as loop, preparing for acquisition of the next document information.

In step S1009, it is checked whether loop is 0. If loop is not 0, a document to be processed remains, and the process returns to step S1006. If loop is 0, the process advances to step S1010.

Figure 11:
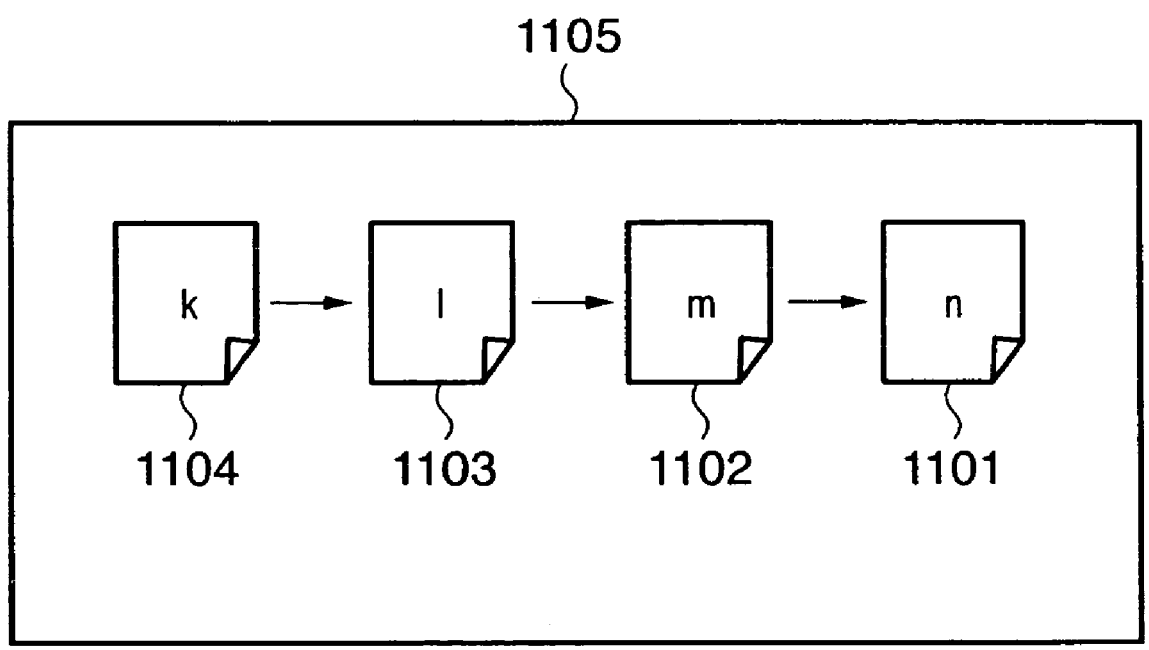
FIG. 11 is a view for explaining a concrete example of the flowchart in FIG. 10.

The process from steps S1004 to S1009 will be explained with reference to FIG. 11. A view 1105 conceptually illustrates a user-specific access list, and the document n (1101) is accessed finally. A previously accessed document is a document m (1102), the second previously accessed document is a document l (1103), and the third previously accessed document is a document k (1104).

For example, for x=2, information of the document l is acquired in the first execution of step S1006, and information of the document m is acquired in the second execution of step S1006. The document n is the second subsequently accessed document when viewed from the document l, and is the first subsequently accessed document when viewed from the document m. That is, in step S1007, the information that the document n is subsequently accessed is recorded in "related document access information" of the documents l and m.

In step S1010, it is determined whether it is set to record a previously accessed document. If YES in step S1010, the process advances to step S1011; if NO, the process ends. In step S1011, y is substituted into loop. In this case, y represents that it is set to record documents up to the yth previously accessed document. In step S1012, it is checked whether the record of the (loop)th previous document counted from the document n exists in the "user-specific access list". If YES in step S1012, the process advances to step S1013; if NO, to step S1015.

In step S1013, the (loop)th previous document information counted from the document n is acquired from the "user-specific access list". The document information is a document attribute formed from information on a document management database which stores a document, an ID for identifying the document, and the like. In step S1014, the document and document information acquired in step S1013 are recorded as the −(loop)th previously accessed document in the "related document access information" of the document n. In step S1015, a value calculated by subtracting 1 from loop is set again as loop, preparing for acquisition of the next document information.

In step S1016, it is checked whether loop is 0. If loop is not 0, a document to be processed remains, and the process returns to step S1012. If loop is 0, the process ends.

The process from steps S1010 to S1016 will be explained with reference to FIG. 11, similar to the above-described process. For example, for y=2, information of the document 1 is acquired in the first execution of step S1013, and information of the document m is acquired in the second execution of step S1013. When viewed from the document n, the document 1 is the second previously accessed document, and the document m is the first previously accessed document. That is, in step S1014, the documents 1 and m are recorded as previously accessed documents in "related document access information" of the document n.

<Outline of Search Process>

An example in which a user having a user ID "00110" searches the database 601 on the basis of a desired query will be explained with reference to FIGS. 1, 6, and 7. The user instruction unit 102 transmits a search instruction to the search unit 106. Control is passed to the database selection unit 107 in order to search the designated document management database 601 by a search execution unit 111 in the search unit 106. The database selection unit 107 selects the document management database 110 (corresponding to 601 in FIG. 6), and causes the document management database 110 to execute search. The search method may be retrieval based on a document attribute or full-text retrieval. Assume that the document B is hit as a result of search and the search score is 300. The number of documents as search results is one for descriptive convenience, but a plurality of search results may be found.

The document management database 110 outputs "related document access information" of each hit document together with search results (hit documents and scores each representing goodness of fit). These results are sent to a search result processing unit 112.

For each hit document included in the search results, the search result processing unit 112 extracts a related document close in access order to the hit document, using the "related document access information." The search result processing unit 112 calculates the related level (it is occasionally called relevance ratio) of the related document. The related level indicates a relevance of the related document to the hit document by performing the following process. This will be explained using the related document access information in FIG. 7. Information on the user is selected from "related document access information". In this case, the id attribute of the AccessUser element is 00110. A related level "10" is assigned to a document (order attribute=1: document E) accessed next to a target document (document B), and a related level "5" is assigned to the second next document (order attribute=2: document C). The related level can be an arbitrary positive number. The related levels "10" and "5" are merely an example, and the related level is not limited to them. The related level may also be determined using expression (2) to be described later.

The search result processing unit 112 calculates the score of a related document from the calculated related level. The related level of each related document is so normalized as to fall within a value in [0,1]. In the first embodiment, the number of documents related to a hit document is two, and the sum of related levels is 10+5=15. Thus, the normalized related level is 10/15 for the document E, and 5/15 for the document C. The score of each related document is calculated using an evaluation equation:

$$S_n = int((S_0 \times R_n)) - 1 \quad (1)$$

$$\begin{cases} S_0: \text{score of original document} \\ S_n: \text{score of document } n \\ R_n: \text{normalized related level of document } n \end{cases}$$

The score is (300×10/15)−1=199 for the document E, and (300×5/15)−1=99 for the document C. In this equation, int is a function of obtaining an integer by round-up, round-down, round-off, or the like, and a proper integerization method is used. In evaluation equation (1), 1 is subtracted to always rank a document at a level lower than an original document (hit document) because a normalized related level takes a value within [0,1] and is multiplied by the score of the original document. The search result processing unit 112 transmits the hit document, its score, its related documents, and the calculated scores to a search result arranging unit 113. The search result arranging unit 113 sorts and arranges search results on the basis of the scores, and outputs the results to the output device 104. Calculation of the related level, the normalization method, and evaluation equation (1) are merely an example for explaining the first embodiment, and another evaluation equation and the like can be adopted.

In the above example, the number of hit documents is one. In some cases, a plurality of documents may be hit, and the same related document may be contained in some of the hit documents. For example, when the document management database 110 is searched, the document A is hit in addition to the document B. The score of the document A is 90, a document accessed immediately after the document A is the document C (related level=10), and a document accessed after the document C is the document F (related level=5). A normalized related level is calculated in accordance with evaluation equation (1) to be (90×10/15)−1=59 for the document C and (90×5/15)−1=29 for the document F. Hence, the document C is contained as a document related to both the documents A and B. In the first embodiment, when a plurality of identical related documents are hit, the document having the highest score is adopted. In the above example, a score "99" is adopted for a document related to the document B. As another method of calculating the score of the document C, i) a lower score may be adopted (in this case, 59), or ii) an average value may be used as a score (in this case, 79). Moreover, the user or the administrator of the document management system may select a desired one of these methods.

When documents accessed before and after a target document are recorded, as described with reference to FIG. 8, the related levels of previous and subsequent documents may be set equal on the basis of the access distance (absolute value of the order attribute), or the related levels of previous and subsequent documents may be changed. When the same related level is given regardless of the access order, for example, expression (2) can be used:

$$int\left(10 \times \frac{1}{|\text{order}|}\right) \quad (2)$$

where int is a function of obtaining an integer by round-up, round-down, round-off, or the like. A proper integerization method can be selected. The related level is 10 for a distance of 1 and 5 for a distance of 2 regardless of the access order. By changing the related level expression in accordance with the access order, the value of the related level can also be changed in accordance with the access order.

The score of a related document may also be calculated by performing weighting in accordance with the interval of the access time. For example, "related document access information" includes the date and time attributes, and documents whose access intervals are equal to or longer than a predetermined time or a predetermined number of days are determined as unrelated documents in calculating the related level. This is because a document accessed after a long time is considered to be rarely related to a target document. For example, a document which is not accessed for a time α or more on the basis of the date and time attributes is determined as an unrelated document and multiplied by a weight of, e.g., 0. A document which is not accessed for a time equal to or longer than a time β and shorter than the time α is so weighted as to decrease its related level (for example, a document is multiplied by a weight of 0.5) (α>β).

<Flow of Search Process>

Figure 12:
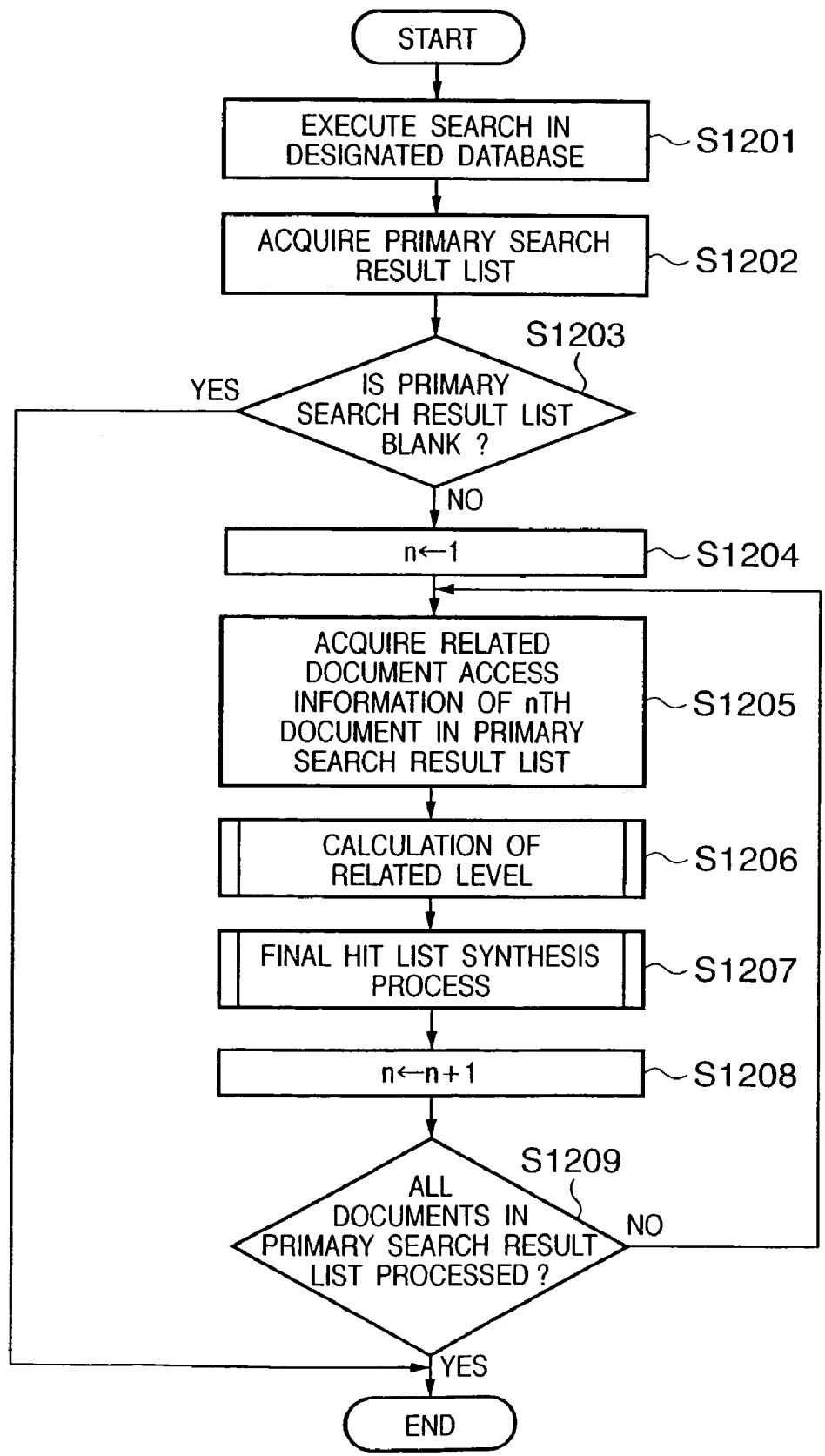
FIG. 12 is a flowchart showing the flow of a process of generating search results containing a related document from the search results of a single database.

A method of generating search results ("final hit list") containing a related document from the search results ("primary search result list") of a single database will be explained with reference to the flowchart of FIG. 12.

The "final hit list" is a list of final search results which present, to the user, not only the search results of a searched database but also documents related to documents as the search results by calculating dummy scores from the scores of the actually searched documents and the related levels of the related documents.

In step S1201, a designated database is searched. The search method may be retrieval based on the attribute or full-text retrieval, and the search method and technique are arbitrary. In step S1202, a "primary search result list" is acquired from the designated database.

An example of the "primary search result list" acquired in step S1202 is a table format which is made up of a document ID (1301), document name (1302), and score (1303), as shown in FIG. 13. This table lists documents which are hit by search and sorted by their scores. The "primary search result list" is not limited to the table format, and may have the XML format or another format.

In step S1203, it is checked whether a search result exists in step S1201. If no search result exists (no document is hit), no related document can be searched for, and the process ends. If a search result exists, the process advances to step S1204 to substitute 1 into n.

In step S1205, "related document access information" for the nth document (to be referred to as a document n hereinafter) in the "primary search result list" is acquired. In step S1206, the related levels of all documents related to the document n are calculated. In step S1207, a final hit list synthesis process of inserting the document n and its related documents to the "final hit list" is performed on the basis of the related levels calculated in step S1206. In step S1208, 1 is added to n.

In step S1209, it is checked whether all documents in the "primary search result list" have been processed. If all documents have not been processed, the process returns to step S1205. If all documents have been processed, the process ends. Flowcharts for calculation of the related level in step S1206 and the final hit list synthesis process in step S1207 will be described later.

<Flow of Related Level Calculation Process>

Figure 14:
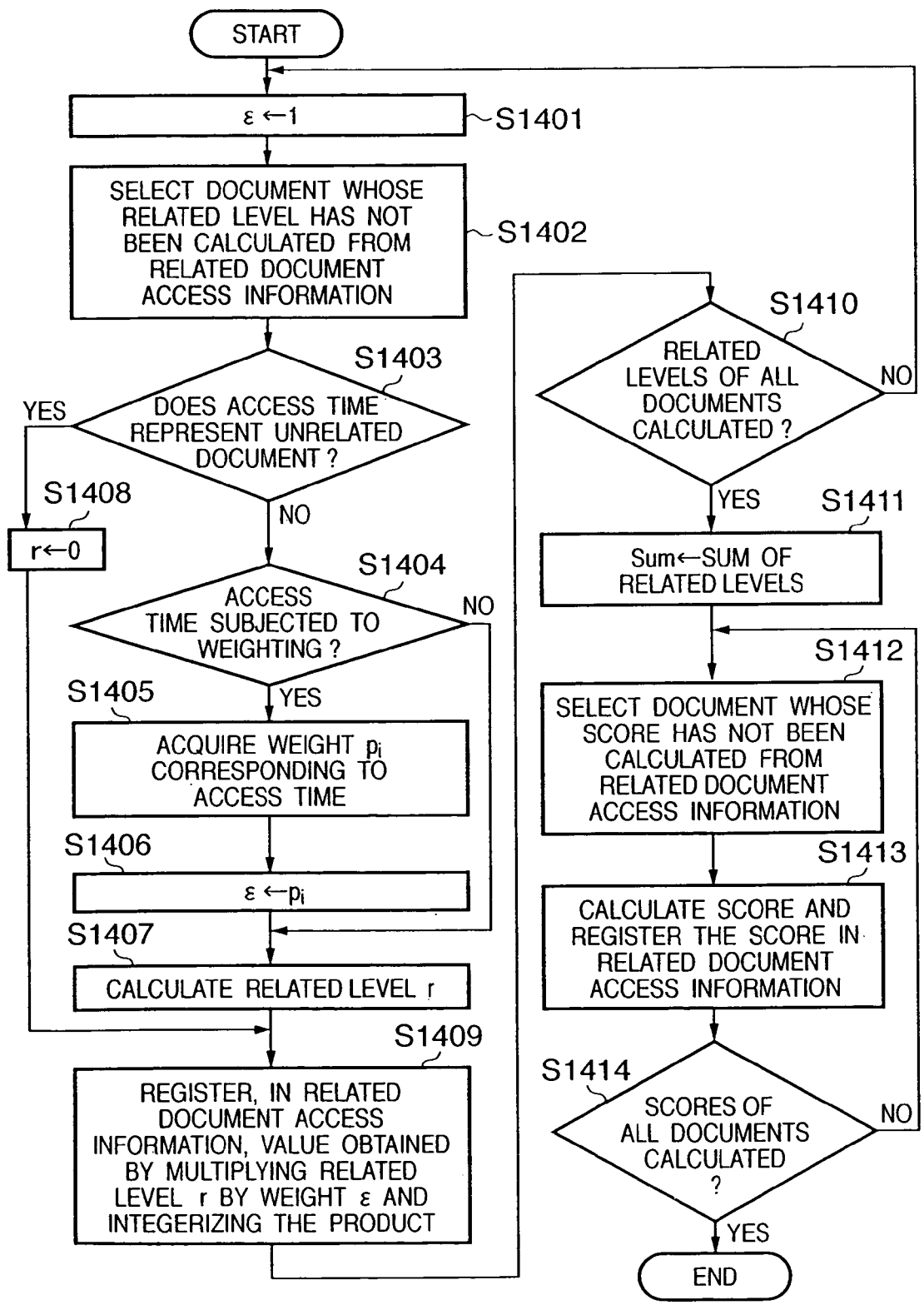
FIG. 14 is a flowchart showing the flow of a process of calculating a related level.

A process of calculating a related level in step S1206 will be explained with reference to the flowchart of FIG. 14. In steps S1401 to S1410, the related level of a related document is calculated. In step S1401, 1 is substituted into ε. In this case, ε is a weight added to the related level. In step S1402, a related document whose related level has not been calculated is selected from "related document access information" of the document n obtained in step S1205. Although not shown in the flowchart of FIG. 14, the process in FIG. 14 is skipped when no related document exists in the "related document access information" obtained in step S1205.

In step S1403, it is determined whether the access time in document information of the related document selected in step S1402 is equal to or longer than a predetermined time used to determine whether document is an unrelated document. More specifically, the date and time attributes of a base document (document whose order attribute is 0) and those of the document selected in step S1402 are compared to check whether these documents have a difference of a predetermined time or more. If the selected document was accessed after the predetermined time or more, the process advances to step S1408.

In step S1408, a related level r is set to 0 (the selected document is not related to the base document). If the predetermined time used to exclude an unrelated document has not elapsed, the process advances to step S1404. In step S1404, it is determined whether the access time of the document information selected in step S1402 is a time subjected to weighting. If NO in step S1404, the process advances to step S1407; if YES, to step S1405.

In step S1405, a weight $p_i$ ($0<p_i<1$) is selected in accordance with the difference in access time between the base document and the document selected in step S1402. In this case, i is an index corresponding to the difference in access time. In step S1406, $p_i$ is substituted into ε.

A more concrete example of weighting based on the access time in steps S1403 to S1406 will be described. Assume that the date attribute of a hit document (document whose order attribute is 0) serving as the base of a related document is "2004-06-25", and the time attribute is "17:48:05+900". For example, when a document which has not been accessed for more than 12 h is determined as an unrelated document, a document having a date attribute "2004-06-26" and a time attribute "9:21:02+0900" is determined as an unrelated document.

A table for determining pi in accordance with the access time difference is prepared for a related document to be weighted, as shown in FIG. 15. The table in FIG. 15 is an example. The weight $p_i$ is 0.9 when the access time difference is more than 1 h and equal to or less than 2 h. The weight $p_2$ is 0.8 when the access time difference exceeds 2 h and falls within 3 h. The weight $p_3$ is 0.5 when the access time difference exceeds 3 h and falls within 6 h. The weight $p_4$ is 0.1 when the access time difference exceeds 6 h and falls within 12 h. When the access time difference exceeds 12 h, a document is determined as an unrelated document, as described above.

In step S1407, the related level r of the document selected in step S1402 is calculated. Calculation of the related level uses, e.g., expression (2), as described above. In step S1409, a value obtained by multiplying the related level r by the weight $\epsilon$ and integerizing the product is registered as a finally calculated related level for the related document selected in step S1402 in "related document access information". The integerization function int is identical to that described above.

In step S1410, it is determined whether all related documents in the "related document access information" have undergone the process of calculating a related level. If there is a document whose related level has not been calculated yet, the process returns to step S1401; if all documents have been processed, the process advances to step S1411.

In step S1411, the sum of the related levels of all related documents is calculated and substituted into Sum. Although not shown for descriptive convenience, if Sum is 0 after step S1411, no related document is found, and step S1412 and subsequent steps are not executed.

In steps S1412 to S1414, the score of each related document is obtained on the basis of the final related level calculated in steps S1401 to S1410. In step S1412, a related document whose score has not been calculated yet is selected from the "related document access information" obtained in step S1205 of FIG. 12. A related level is registered in the "related document access information" in step S1409.

In step S1413, the score of the related document is calculated and registered in the "related document access information" of the document selected in step S1412. For example, a process using equation (1) will be explained. A score is calculated by acquiring the related level r of the related document from related document information, integerizing the quotient of r divided by Sum attained in step S1411, and subtracting 1 from the product of the integer and a score S0 of the base document. More detailed calculation has been described with reference to equation (1).

In step S1414, it is determined whether all related documents have undergone the process of calculating a score. If there is a related document whose score has not been calculated yet, the process returns to step S1412; if all related documents have been processed, the process ends.

Figure 16:
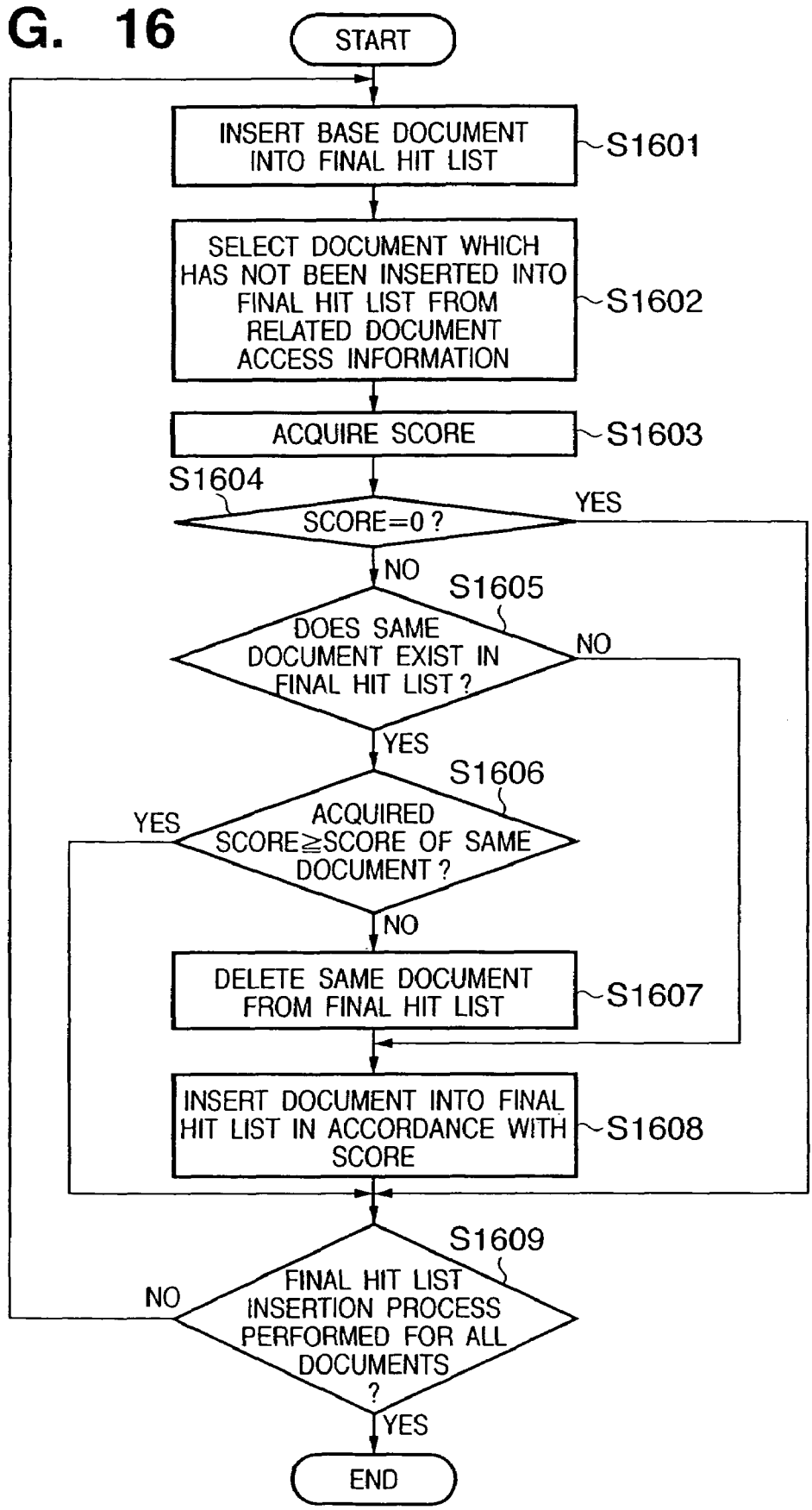
FIG. 16 is a flowchart showing the flow of a final hit list synthesis process.
Figure 17:
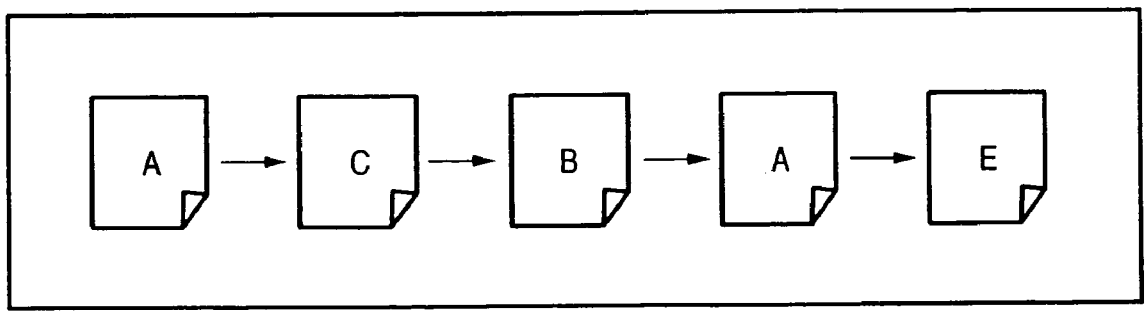
FIG. 17 is a view for explaining an example of the same related document.

In the flowchart of FIG. 14, the same related document may appear a plurality of number times for a document which has been hit in search (the same document may appear a plurality of number of times in related document access information). For example, when "related document access information" is created in an access order shown in FIG. 17 and the document B is a document which has been hit in search, the document A is accessed before and after the document B. In FIG. 14, the same document A is processed as different related documents to calculate scores, and undergoes a process in step S1207 (to be described later: details thereof will be described with reference to the flowchart of FIG. 16). In the first embodiment, as shown in FIG. 16, a higher one of scores for the same related document is employed. In this manner, scores may be separately calculated for the same related document to treat it as different related documents. Upon calculating related levels, a higher related level may be extracted in advance. It is also possible to adopt a process of combining pieces of information on the same related document into one in the process of steps S1401 to S1410 such as a process of calculating the sum of related levels for the same related document. More specifically, when the same related document appears a plurality of number of times in related document access information in step S1409, a process of giving priority to a higher related level or a process of calculating the sum of related levels is executed.

<Flow of Final Hit Synthesis Process>

The final hit list synthesis process in step S1207 will be described with reference to the flowchart of FIG. 16. In step S1601, the score of the nth document n in the "primary search result list" acquired in step S1205 is inserted into a corresponding score position of the "final hit list". As a matter of course, no document is registered in the "final hit list" at first.

In step S1602, a document which has not been inserted into the "final hit list" is selected from "related document access information" of the document n. In step S1603, the score of the related document selected in step S1602 is acquired. In step S1604, it is determined whether the score is 0. If the score is 0, this means that the document is not related to a base document, and the process advances to step S1609 to process the next document. If the score is not 0, the process advances to step S1605.

In step S1605, it is checked whether the document selected in step S1602 exists in the final hit list. As the check method, for example, whether the same document ID exists is determined. If the same document does not exist, the process advances to step S1608; if the same document exists, the process advances to step S1606.

In step S1606, the score of the same document in the "final hit list" is compared with that of the document selected in step S1602. If the score of the same document in the "final hit list" is equal to or higher (YES in step S1606), the process advances to step S1609. If NO in step S1606, the process advances to step S1607. In step S1607, the same document in the "final hit list" is deleted. In step S1608, the document selected in step S1602 is inserted into a corresponding score position in the "final hit list".

In step S1609, it is determined whether all related documents in the "related document access information" have undergone the process of inserting a related document into the "final hit list". If an unprocessed document remains, the process returns to step S1602; if all documents have been processed, the process ends.

The flowchart of FIG. 16 shows the process of giving priority to a document having a higher score. In step S1606, however, if the score of the same document in the final document list is compared with that of the document selected in step S1602 and determined to be equal to or lower, priority is given to a document having a lower score. Alternatively, an average value may be finally calculated and inserted into the final hit list.

<Display of Search Result>

Figure 9:
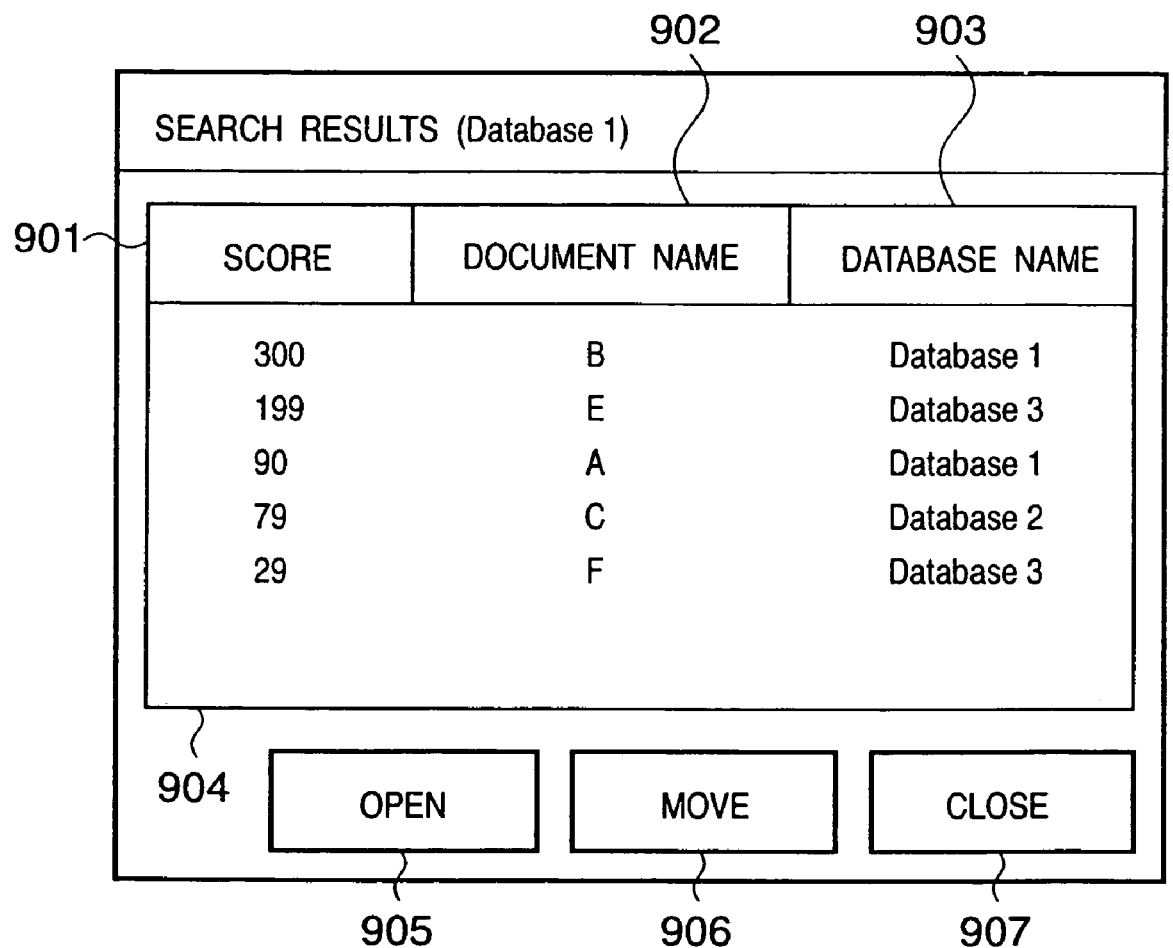
FIG. 9 is a view showing an example of a search result output from a search result arranging unit.

FIG. 9 shows an example of a search result output from the search result arranging unit 113. The search result is displayed in an area 904 as a list made up of the fields of a calculated score 901, document name 902, and database name 903. In FIG. 9, the results of the above-described process are displayed as an example. Operation can be executed for a document selected from the area 904 with buttons at the bottom of the search result list. When an "open button" 905 is executed, a selected document is opened by an application. With a "move button" 906, a database containing a selected document and a directory storing the document are displayed on the document management client software. With a "close button" 907, a search result is terminated and closed. In addition, a button for editing, a button for editing an attribute, or a mechanism of realizing operations provided by general document management client software may be adopted. The number of selectable documents is not limited to one, and a plurality of documents may be selected.

The first embodiment exploits only search results from one database, but search results selected from a plurality of databases may be combined. As the combination method, the scores of documents and related documents may be displayed as one search result. Documents selected by search results from one database may be used to perform narrow search in another database. In this case, a plurality of databases can be searched at a high speed.

As is apparent from the above description, the information processing apparatus according to the first embodiment obtains related documents on the basis of the order of access to documents by the user, and calculates the related level of each related document in accordance with the access order. Even in an environment where a plurality of databases exist, the information processing apparatus can search a single database to present documents in another database as search results.

Even if the number of databases increases, related documents can be attained without searching all the databases, and the search time can be shortened. Since the related level is calculated in accordance with the access order, related documents can be searched for at once for even a document extracted from a different database. Furthermore, an excessive increase in the number of final search results depending on the number of databases can be prevented.

Second Embodiment

The first embodiment uses the same related level regardless of the type of access, but the related level may be changed depending on the type of access. In the second embodiment, the related level is changed on the basis of the type of access, particularly, whether the editing state of a document is checkout or checkin.

Documents accessed until editing of a given document starts (checkout) and ends (checkin) are highly likely referred to in association with the given document, and are regarded to have high related levels. An example of this will be explained with reference to FIG. 18.

Figure 18:
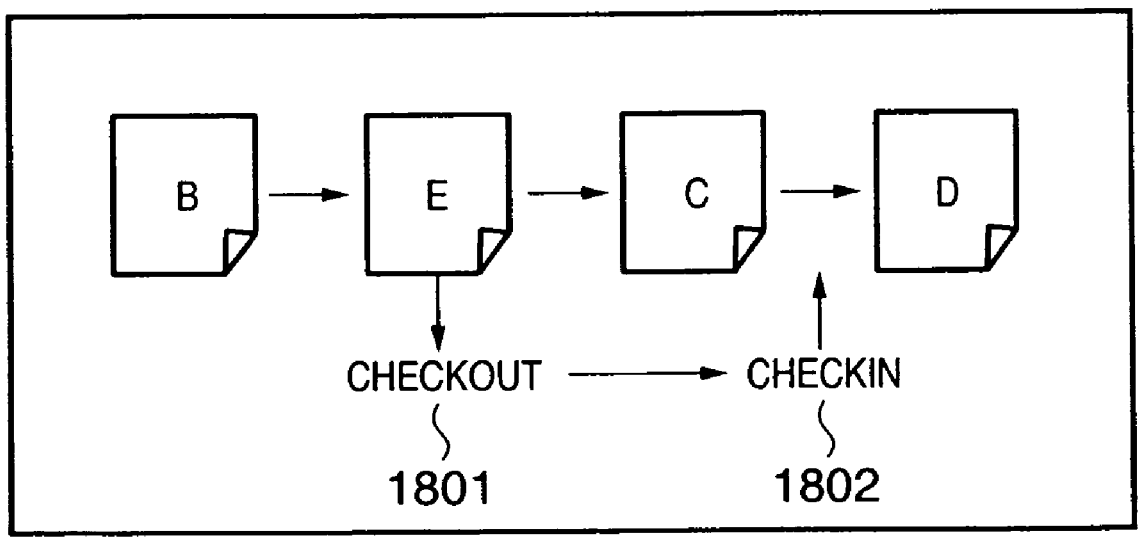
FIG. 18 is a view for explaining a case wherein, while a predetermined document is edited, another document is accessed.

Assume that the order of access to documents is B→E→C→D, as shown in FIG. 18, the document E is opened not for browsing but for editing (checkout 1801), and editing of the document E ends before the document D is opened (checkin 1802). When viewed from the document E, the document C is a document which is opened during checkout (editing). A document referred to during checkout is recorded in related document access information.

More specifically, FIG. 7 shows related document access information of the document B when documents are accessed in the order shown in FIG. 18. When viewed from the document B, checkout and checkin of the document E are done after the document B is opened, and the document E is not recorded.

FIG. 19 shows document access information of the document E. The document E undergoes checkout, the document C is opened while the document E is in the checkout state, and thus the checkout attribute of the Document element is "yes" (1901). The document D is opened after checkin, and no checkout attribute exists for the document D.

FIG. 20 shows related document access information of the document C. Since the document E accessed before the document C is in checkout, the checkout attribute becomes "yes" (2001). The document D is irrelevant to checkout when viewed from the document C, and no checkout attribute exists for the document D. For descriptive convenience, the second embodiment shows related document access information which records two subsequent accesses for the documents B and E, and records one previous access and one subsequent access for the document C. As for a document irrelevant to the checkout state, the checkout attribute is not described, but may be described and given a value "no".

Figure 21:
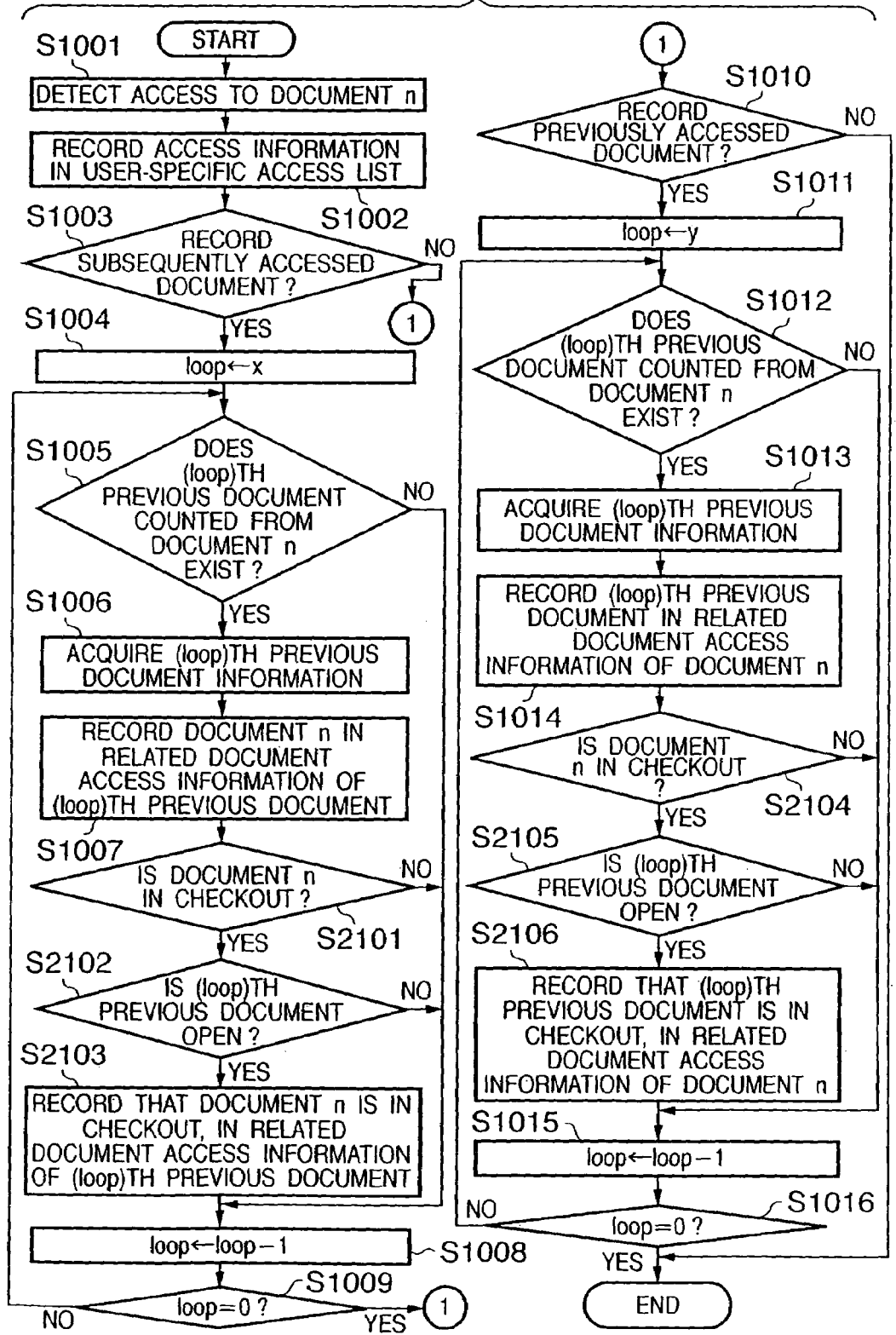
FIG. 21 is a flowchart showing the flow of a process of calculating the related level of a document accessed during editing of another document.

FIG. 21 is a flowchart showing a process of recording a checkout state in related document access information. The same reference numerals as those in FIG. 10 denote the same processes, and a description thereof will be omitted. Differences from the flowchart of FIG. 10 are the following steps. In step S2101 after step S1007, it is determined whether a target document is in checkout. If YES in step S2101, it is confirmed in step S2102 whether the (loop)th previous document is open. If NO in step S2102, the process advances to step S1008; if YES, to step S2103 to record, in related document access information of the (loop)th previous document, that the document n is in checkout ("yes" is set at the checkout attribute). If NO in step S2101, no checkout attribute needs to be recorded, and the process advances to step S1008.

Similarly, in step S2104 after step S1014, it is determined whether a target document is in checkout. If YES in step S2104, it is confirmed in step S2105 whether the (loop)th previous document is open. If NO in step S2105, the process advances to step S1015; if YES, to step S2106 to record, in related document access information of the document n, that the (loop)th previous document n is open during checkout ("yes" is set at the checkout attribute). If NO in step S2104, no checkout attribute need be recorded, and the process advances to step S1015.

Not only information representing checkout or checkin, but information that contents are copied between documents may be recorded. A user input device 101 may be equipped with a mechanism of monitoring an input, and copying of contents between documents opened by the document management system may be detected to write information to this effect in related document access information. Monitoring may be implemented using a clipboard which is a mechanism of temporarily storing data copied on the operating system into a memory.

FIG. 22 shows an example of related document access information when contents are copied between documents. Assume that documents are accessed in the order of FIG. 18 described above, contents are copied from the document B to the document E, and related document access information records two accesses after a target document.

As shown in FIG. 22, information on the document E in related document access information of the document B has a copy attribute, and the content of the copy attribute is "to" (2201). This means that the contents of the document B are copied to the document E. Since the contents are copied to the document E from the document B which is originally not subjected to the record, a Document element whose order attribute is blank is described, and information on the document B is described. The access date and time of the document B are not subjected to the record and are not described, but the copy attribute is described with a content "from", which means that the contents are copied from the document B (2202).

Figure 23:
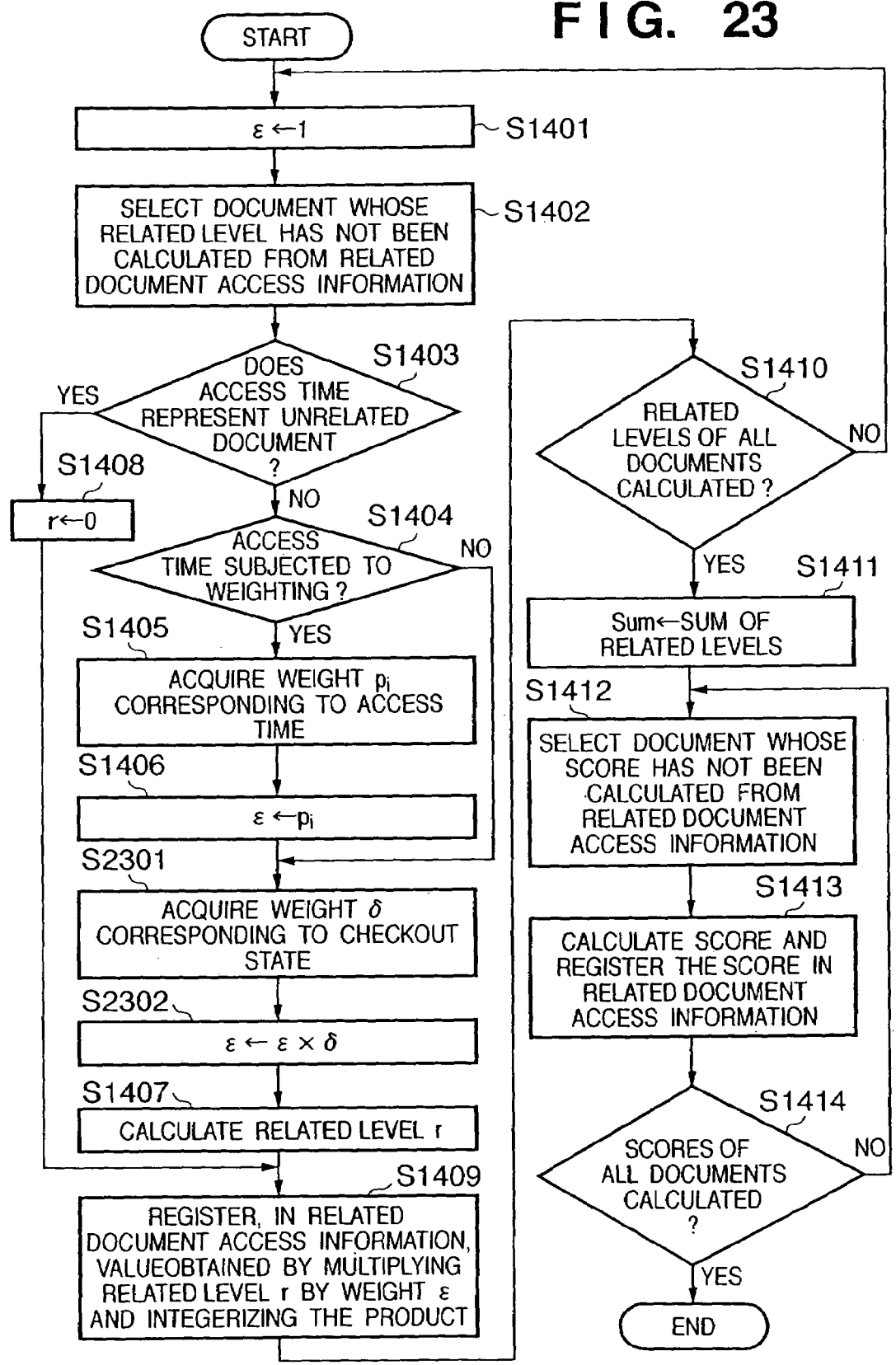
FIG. 23 is a flowchart showing the flow of a process of weighting a related level in accordance with the editing state.

FIG. 23 is a flowchart for explaining a method of calculating a related level to which weighting is set in accordance with the checkout state and copying between documents. This flowchart is almost the same as the flowchart of FIG. 14, the same reference numerals denote the same processes, and a description thereof will be omitted. In step S2301, a weight δ corresponding to the checkout state and copying between documents is acquired. Since a document which is open during checkout or a document having contents copied between documents is regarded to have a high related level, δ>1. In step S2302, ε is multiplied by δ to calculate a weight used to calculate a related level.

A document during checkout may be determined as an unrelated document in step S1403, or may not be multiplied by a low weight on the basis of the access time in step S1404.

By calculating a related level and score in the above way, the related level can be set higher for a document which is opened during editing or a document having contents copied between documents. The score of such a related document can also be set high in the "final hit list".

Third Embodiment

The first and second embodiments process "related document access information" for only the user of the information processing apparatus. Instead, related documents of another user in addition to the user of the information processing apparatus may be searched for. To implement this, for example, in FIG. 14, the related levels of related documents not only for the user of the information processing apparatus but also for all users are calculated in "related document access information".

In place of simply targeting related documents of all users, documents of only a specific user or group may be targeted or determined as unrelated documents. Alternatively, a mechanism of changing the related level by giving a predetermined weight to a specific user or group may be employed.

Figure 24:
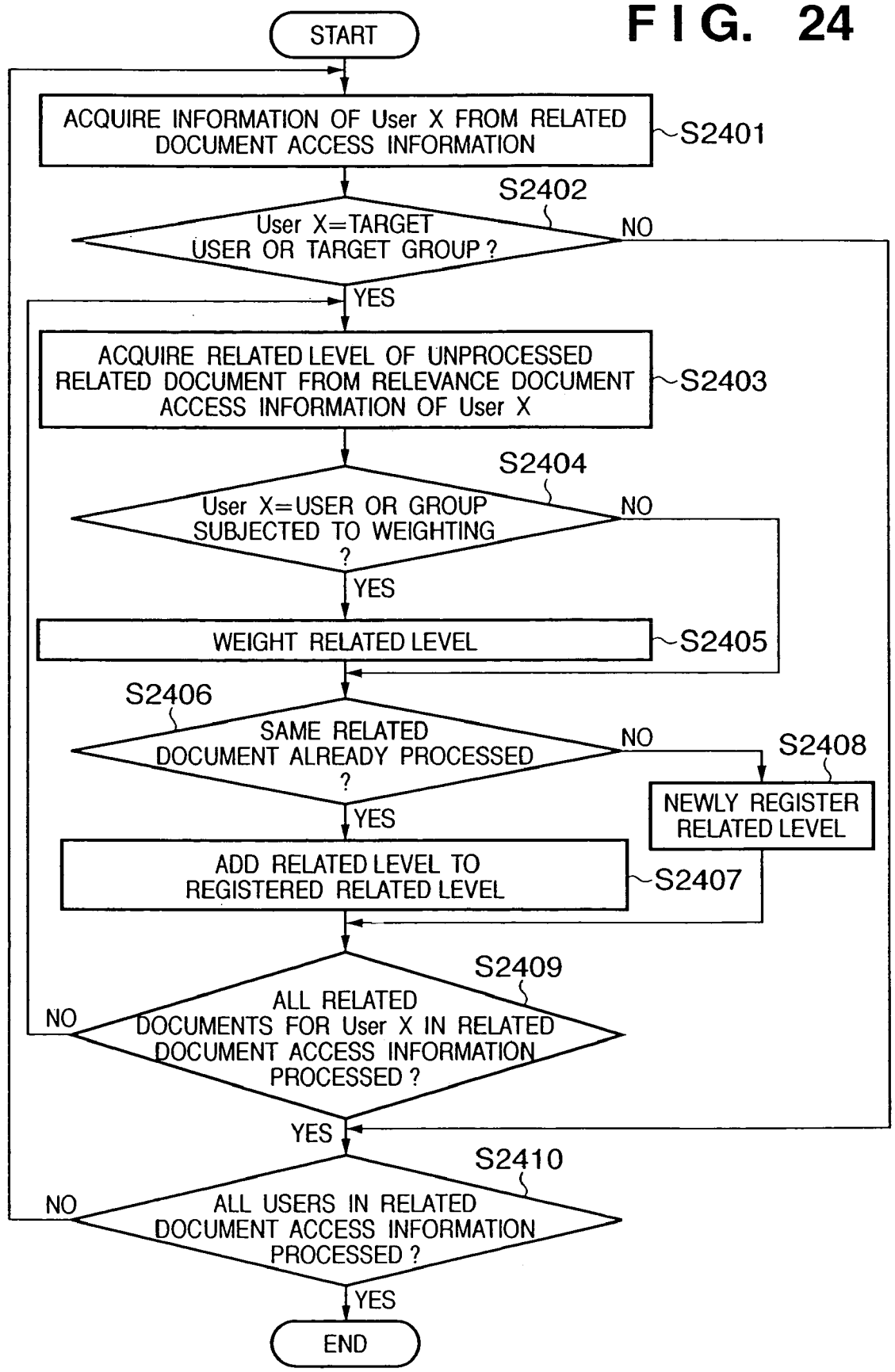
FIG. 24 is a flowchart showing the flow of a process of calculating the sum of related levels for all users who have accessed a document.

A method of combining the related levels of pieces of related document access information of a plurality of users will be explained with reference to the flowchart of FIG. 24. In step S2401, related document access information of User X that has not been processed is acquired from related document access information of a target document. As described in the first embodiment with reference to FIG. 7, one related document access information records pieces of access information of a plurality of users.

In step S2402, it is determined whether User X is a target user or group in terms of related level. If NO in step S2402, the process advances to step S2410; if YES, to step S2403.

In step S2403, the related level of an unprocessed related document is acquired from the related document access information of User X that is acquired in step S2401. In step S2404, it is determined whether User X is a user or group subjected to weighting. If NO in step S2404, the process advances to step S2406; if YES, to step S2405 to weight the related level.

In step S2406, it is determined whether the related level of the same document has already been calculated. If the same document does not exist and its related level is not calculated, the process advances to step S2408 to perform a new registration process for the related level of the related document selected in step S2403. If it is determined in step S2406 that the same document exists, the process advances to step S2407 to perform a related level addition process. In step S2409, it is determined whether all related documents for User X have been processed. If NO in step S2409, the process returns to step S2403; if YES, advances to step S2410. In step S2410, if all users in the related document access information have undergone the process, the process ends; if an unprocessed user remains, returns to step S2401.

Figure 25:
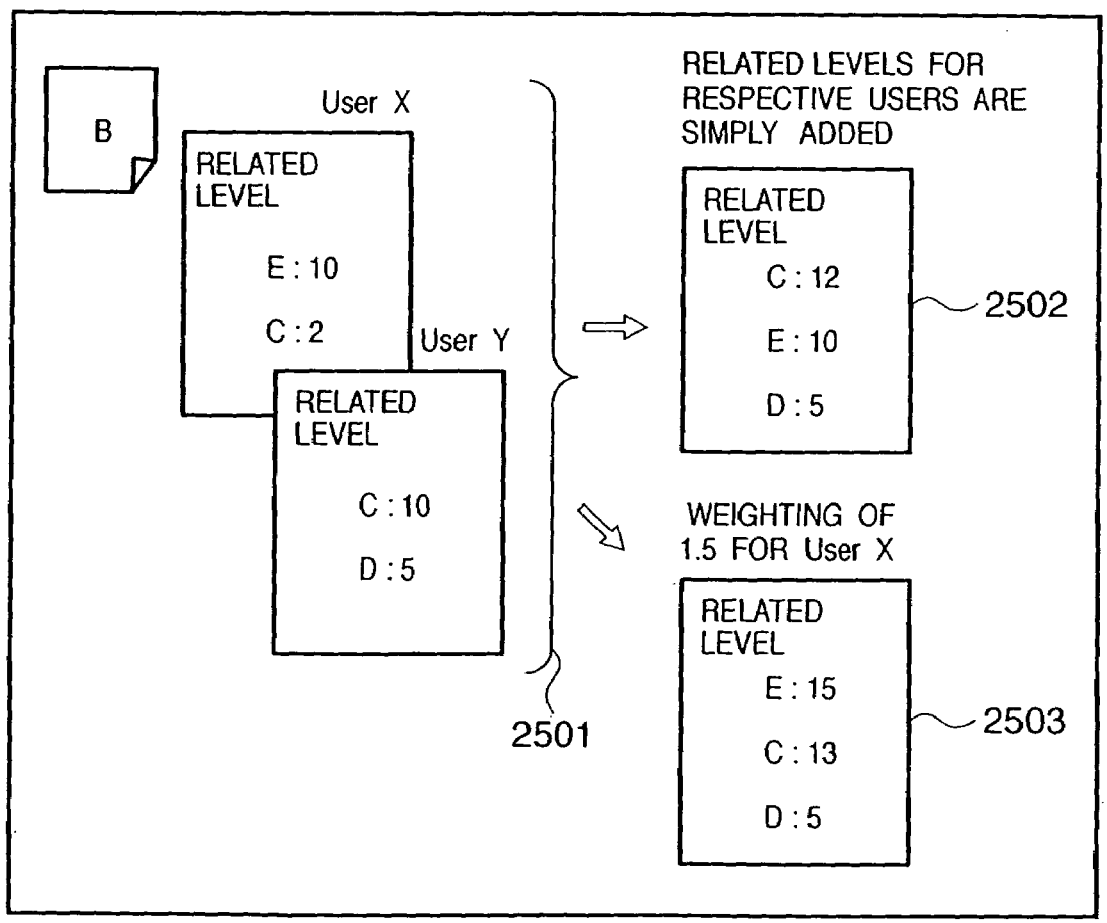
FIG. 25 is a view for explaining how to calculate a related level for each user.

The above process will be explained in more detail with reference to FIG. 25. Assume that related document access information of the document B has information (related levels) on User X and User Y (2501). When related levels for the respective users are simply added, the sum of the related levels of each document for User X and User Y is obtained, as represented by 2502. When, however, a weight of 1.5 is given to User X, the related level of the document D keeps 5, but that of the document E is changed to 10×1.5=15, and that of the document C is changed to 2×1.5+10=13, as represented by 2503. The related level can be changed for a specific user or group.

By weighting or excluding a related level for each user, more detailed scoring can be achieved regardless of the user.

Other Embodiment

The present invention may be applied to a system including a plurality of devices (e.g., a host computer, interface device, reader, and printer) or an apparatus (e.g., a copying machine or facsimile apparatus) formed by a single device.

The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the present invention includes a case wherein, after the program codes read out from the storage medium are written in the memory of a function expansion board inserted into the computer or the memory of a function expansion unit connected to the computer, the CPU of the function expansion board or function expansion unit performs some or all of actual processes on the basis of the instructions of the program codes and thereby realizes the functions of the above-described embodiments.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-231435 filed on Aug. 6, 2004, which is hereby incorporated by reference herein.

What is claimed is:

1. An information processing apparatus which searches a plurality of databases for a document, comprising:
   search unit configured to search for a document stored in an arbitrary database among the plurality of databases and to obtain a primary search result including a hit document;
   recording unit configured to record access information of documents stored in the plurality of databases, wherein the access information includes information of access orders in which the stored documents have been accessed;
   calculation unit configured to extract a related document of which an access order is close to an access order of the hit document included in the primary search result based on the access information, and to calculate a related level of the related document on the basis of the access order of the related document, which is included in the access information; and output unit configured to output as final search results the hit document and the related document based on the related level calculated by said calculation unit, wherein the related level indicates a relevance of the related document to the hit document.

2. The apparatus according to claim 1, wherein said recording unit records access information representing that the related document was accessed while the hit document was edited, and wherein said calculation unit calculates the related level of the related document by weighting based on the access information.

3. The apparatus according to claim 1, wherein said recording unit records access information representing that a copying process was performed between the hit document and the related document, and wherein said calculation unit calculates the related level of the related document by weighting based on the access information.

4. The apparatus according to claim 1, wherein said recording unit records the access information in an XML format.

5. The apparatus according to claim 1, wherein said calculation unit extracts the related document which was accessed within a predetermined time after previous access to the hit document, and calculates the related level of the related document on the basis of the access order of the related document included in the access information.

6. The apparatus according to claim 1, wherein said calculation unit calculates the related level of the related document by weighting based on the access time of the related document, which is included in the access information.

7. The apparatus according to claim 1, wherein said calculation unit extracts the related document accessed by a predetermined user among documents of which an access order is close to an access order of the hit document.

8. The apparatus according to claim 1, wherein said calculation unit calculates the related level of the related document by weighting in accordance with a user which accesses the related document.

9. The apparatus according to claim 1, wherein the arbitrary database can be selected by a user.

10. A document search method of searching a plurality of databases for a document, comprising:

a search step of searching for a document stored in an arbitrary database among the plurality of databases and obtaining a primary search result including a hit document;

a recording step of recording access information of documents stored in the plurality of databases, wherein the access information includes information of access orders in which the stored documents have been accessed;

a calculation step of extracting a related document of which an access order is close to an access order of the hit document included in the primary search result based on the access information, and calculating a related level of the related document on the basis of the access order of the related document, the access order being included in the access information; and an output step of outputting as final search results the hit document and the related document extracted based on the related level calculated in the calculation step, wherein the related level indicates a relevance of the related document to the hit document.

11. A computer readable storage medium storing a control program for causing a computer to implement a document search method defined in claim 10.

* * * * *